United States Patent
Huang et al.

(10) Patent No.: US 7,545,381 B2
(45) Date of Patent: Jun. 9, 2009

(54) INTERRUPTIBLE GPU AND METHOD FOR CONTEXT SAVING AND RESTORING

(75) Inventors: Hsilin Huang, Milpitas, CA (US);
Timour Paltashev, Fremont, CA (US);
John Brothers, Calistoga, CA (US)

(73) Assignee: Via Technologies, Inc., Taipei (TW)

( * ) Notice: Subject to any disclaimer, the term of this patent is extended or adjusted under 35 U.S.C. 154(b) by 472 days.

(21) Appl. No.: 11/272,356

(22) Filed: Nov. 10, 2005

(65) Prior Publication Data

US 2007/0103476 A1    May 10, 2007

(51) Int. Cl.
G06T 1/00 (2006.01)
G06F 9/46 (2006.01)
G06T 1/20 (2006.01)

(52) U.S. Cl. .................. 345/522; 718/107; 718/108; 345/506

(58) Field of Classification Search .......... 718/107, 718/108; 345/522, 506
See application file for complete search history.

(56) References Cited

U.S. PATENT DOCUMENTS

| | | | |
|---|---|---|---|
| 5,371,849 A | 12/1994 | Peaslee et al. ............ 345/553 |
| 5,428,779 A * | 6/1995 | Allegrucci et al. ........ 718/108 |
| 5,430,841 A | 7/1995 | Tannenbaum et al. ...... 345/502 |
| 5,764,959 A * | 6/1998 | Sharangpani et al. ....... 710/66 |
| 6,208,361 B1 | 3/2001 | Gossett .................... 345/536 |
| 6,437,788 B1 | 8/2002 | Milot et al. ............... 345/552 |
| 6,466,222 B1 | 10/2002 | Kao et al. ................. 345/558 |
| 6,674,841 B1 | 1/2004 | Johns et al. ............... 379/67.1 |
| 6,782,432 B1 * | 8/2004 | Nelson et al. ............... 710/1 |
| 7,173,627 B2 | 2/2007 | Doyle et al. |
| 2002/0073255 A1 | 6/2002 | Davidson et al. ........... 710/104 |
| 2002/0172320 A1 | 11/2002 | Chapple .................... 377/44 |
| 2003/0001848 A1 | 1/2003 | Doyle et al. ............... 345/501 |
| 2003/0058249 A1 | 3/2003 | Malka et al. ............... 345/582 |
| 2003/0142037 A1 | 7/2003 | Pinedo et al. .............. 345/1.1 |
| 2003/0218608 A1 * | 11/2003 | Chin et al. ................. 345/419 |
| 2004/0252126 A1 | 12/2004 | Margittai et al. .......... 345/535 |
| 2005/0024385 A1 | 2/2005 | Gruber ..................... 345/606 |
| 2007/0101108 A1 * | 5/2007 | Grossman et al. .......... 712/228 |

FOREIGN PATENT DOCUMENTS

CN    1639686    7/2005

* cited by examiner

*Primary Examiner*—Kee M Tung
*Assistant Examiner*—Jacinta Crawford
(74) *Attorney, Agent, or Firm*—Thomas, Kayden, Horstmeyer & Risley

(57) ABSTRACT

A graphics processing unit ("GPU") is configured to receive an interrupt command from a CPU or internal interrupt event while the GPU is processing a first context. The GPU saves the first context to memory and records a precise processing position for the first context corresponding to the point interrupted. Thereafter, the GPU loads a second context to the processing portion of the GPU from memory and begins executing instructions associated with the second context. After the second context is complete of if an interrupt command directs restoration of the first context, the GPU's processor switches to the first context for continued processing. The first context is retrieved from memory and restored to the precise processing position where previously interrupted. The GPU then processes a remainder portion of the first context from the precise processing point to an end of the first context.

9 Claims, 23 Drawing Sheets

TG DECODER FLOWCHART

INTERRUPTIBLE GPU AND METHOD FOR CONTEXT SAVING AND RESTORING

CROSS-REFERENCE TO RELATED APPLICATIONS

This application is related to the following copending U.S. utility patent applications: (1) U.S. Patent Application entitled "INTERRUPTIBLE GPU AND METHOD FOR PROCESSING MULTIPLE CONTEXTS AND RUN-LISTS," filed on Nov. 10, 2005, and having assigned Ser. No. 11/271,169, which is entirely incorporated herein by reference; and (2) U.S. Patent Application entitled "GRAPHICS PIPLELINE PRECISE INTERRUPT METHOD AND APPARATUS," filed on Nov. 10, 2005, and assigned Ser. No. 11/272,220, which is also entirely incorporated herein by reference.

TECHNICAL FIELD

The present disclosure relates to graphics processing and, more particularly, to a system and method for saving and restoring contexts in an interruptible graphics processing unit.

BACKGROUND

Today's computer systems typically include multiple processors. For example, a graphics processing unit (GPU) is an example of a coprocessor in addition to a primary processor, such as a central processing unit (CPU), that performs specialized processing tasks for which it is designed. In performing these tasks, the GPU may free the CPU to perform other tasks. In some cases, coprocessors, such as a GPU, may actually reside on the computer system's motherboard along with the CPU, which may be a microprocessor. However, in other applications, as one of ordinary skill in the art would know, a GPU and/or other coprocessing devices may reside on a separate but electrically coupled card, such as a graphics card in the case of the GPU.

A coprocessor such as a GPU may often access supplemental memory, such as video memory, for performing its processing tasks. Coprocessors may be generally configured and optimized for performing specialized tasks. In the case of the GPU, such devices may be optimized for execution of three dimensional graphics calculations to support applications with intensive graphics. While conventional computer systems and coprocessors may adequately perform when running a single graphically intensive application, such computer systems and coprocessors may nevertheless encounter problems when attempting to execute multiple graphically intensive applications at once.

It is not uncommon for a typical coprocessor to schedule its processing workload in an inefficient manner. In some operating systems, a GPU may be multitasked using an approach that submits operations to the GPU in a serialized form such that the GPU executes the operations in the order in which they were received. One problem with this approach is that it does not scale well when many applications with differing priorities access the same resources. In this nonlimiting example, a first application that may be currently controlling the resources of a GPU coprocessor needs to relinquish control to other applications for the other applications to accomplish their coprocessing objectives. If the first application does not relinquish control to the other waiting application, the GPU may be effectively tied up such that the waiting application is bottlenecked while the GPU finishes processing the calculations related to the first application. As indicated above, this may not be a significant bottleneck in instances where a single graphically intensive application is active; however, the problem of tying up a GPU or other coprocessor's resources may become more accentuated when multiple applications attempt to use the GPU or coprocessor at the same time.

The concept of apportioning processing between operations has been addressed with the concept of interruptible CPUs that context switch from one task to another. More specifically, the concept of context save/restore has been utilized by modern CPUs that operate to save the content of relevant registers and program counter data to be able to resume an interrupted processing task. While the problem of apportioning processing between the operations has been addressed in CPUs, where the sophisticated scheduling of multiple operations is utilized, scheduling for coprocessors has not been sufficiently addressed.

At least one reason for this failure is related to the fact that coprocessors, such as GPUs, are generally viewed as a resource to divert calculation-heavy and time consuming operations away from the CPU so that the CPU may be able to process other functions. It is well known that graphics operations can include calculation-heavy operations and therefore utilize significant processing power. As the sophistication of graphics applications has increased, GPUs have become more sophisticated to handle the robust calculation and rendering activities.

Yet, the complex architecture of superscalar and EPIC-type CPUs with parallel functional units and out-of-order execution has created problems for precise interruption in CPUs where architecture registers are to be renamed, and where several dozens of instructions are executed simultaneously in different stages of a processing pipeline. To provide for the possibility of precise interrupt, superscalar CPUs have been equipped with a reorder buffer and an extra stage of "instruction commit (retirement)" in the processing pipeline.

Current GPU versions use different type of commands, which can be referred as macroinstructions. Execution of each GPU command may take from hundreds to several thousand cycles. GPU pipelines used in today's graphics processing applications have become extremely deep in comparison to CPUs. Accordingly, most GPUs are configured to handle a large amount of data at any given instance, which complicates the task of attempting to apportion the processing of a GPU, as the GPU does not have a sufficient mechanism for handling this large amount of data in a save or restore operation. Furthermore, as GPUs may incorporate external commands, such as the nonlimiting example of a "draw primitive," that may have a long sequence of data associated with the command, problems have existed as to how to accomplish an interrupt event in such instances.

Thus, there is a heretofore-unaddressed need to overcome these deficiencies and shortcomings described above.

SUMMARY

A graphics processing unit ("GPU") is configured to be interruptible so that it may execute multiple graphics programs at the same relative time. The GPU is configured in hardware for interruptible operation and operates to provide multiple programs access to processing so as to be able to switch between multiple tasks.

The GPU is configured to receive an interrupt command from a CPU while the GPU is processing a first context. Alternatively, an interrupt event can be generated in internal GPU circuits as the result of a page fault (as a nonlimiting example) in the GPU's virtual memory mechanism. In either case, the GPU saves the first context to memory and records a precise processing position for the first context corresponding to the point interrupted. Thereafter, the GPU loads a second context to the processing portion of the GPU from memory and begins executing instructions associated with the second context. After the second context is complete or if an external interrupt command or internal interrupt event directs restoration of the first context, the GPU's processor switches to the first context for continued processing. The first context is retrieved from memory and restored to the precise processing position where previously interrupted. The GPU then processes a remainder portion of the first context from the precise processing point to an end of the first context.

The GPU includes one or more processors configured to communicate receipt of interrupt commands or internal interrupt events to a processing pipeline. The processing pipeline is configured to complete a predetermined amount of processing on the first context while also discarding some data and terminating further processing on other aspects of the first context. The processing pipeline includes a number of components that communicate a state of the first context when interrupted to the one or more processors, which stores the states for future reference. Subsequently, the one or more processors retrieve the saved states from memory and communicate the states to the processing pipeline to resume processing from the point of prior interruption. In this manner, the GPU can switch between a plurality of contexts so that processing resources in the GPU can be shared.

Other systems, methods, features, and advantages of this disclosure will be or become apparent to one with skill in the art upon examination of the following drawings and detailed description. It is intended that all such additional systems, methods, features, and advantages be included within this description, be within the scope of this disclosure, and be protected by the accompanying claims.

DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

This disclosure provides for advanced scheduling so as to virtualize a GPU, thereby enabling different processes seeking GPU processing to be assigned a timeslot to be executed and provided some level of service that an operating system can control. While several applications may share the GPU, the operating system may be configured to schedule each application according to various criteria, such as when, as a nonlimiting example, a time quantum of one process expires, the GPU may schedule another process or even reschedule the same process to run in a next time slot.

A process may comprise a number of contexts, or operations, related to portions of the process being executed as a whole. As described herein, a context may represent all the state of the GPU at the time of a last execution (or initial execution) of the process on the GPU. The state may include the state registers, cache and memory contents, all the internal FIFOs, internal registers, etc. at the time of the last switch from one context to a different context, perhaps, as a nonlimiting example for a different process being executed by the GPU.

While it may not be practical to save an entire state of a GPU when a context is switched, the entire state may also not be needed, since a switch may be permitted to transpire between 1 to 3 milliseconds. During this time, the GPU can be configured to wrap up some level of processing so as to minimize an amount of a state that is saved.

GPUs may be configured with deep pipelines such that a significant number of triangles and pixels are contained in various stages of completion at any given cycle. Plus, a typical GPU may read, modify, and/or write to memory throughout the various stages of the processing pipeline. As a nonlimiting example, a GPU may be configured in the Z stages to read, compare, and conditionally update Z. Additionally, a write back unit of the GPU may be configured for destination blending of graphics elements. Thus, for these reasons, memory may be part of the state that is tracked, and if the context is going to be stopped and restarted, the GPU should not read/modify/write the same memory for the same pixel a second time. In this nonlimiting example, blending twice would yield different results. Thus, the GPU may be configured so that it does not track, as part of the saved state, all the history of what was written to memory up to the point of the context switch so as to avoid this situation described above.

Figure 1:
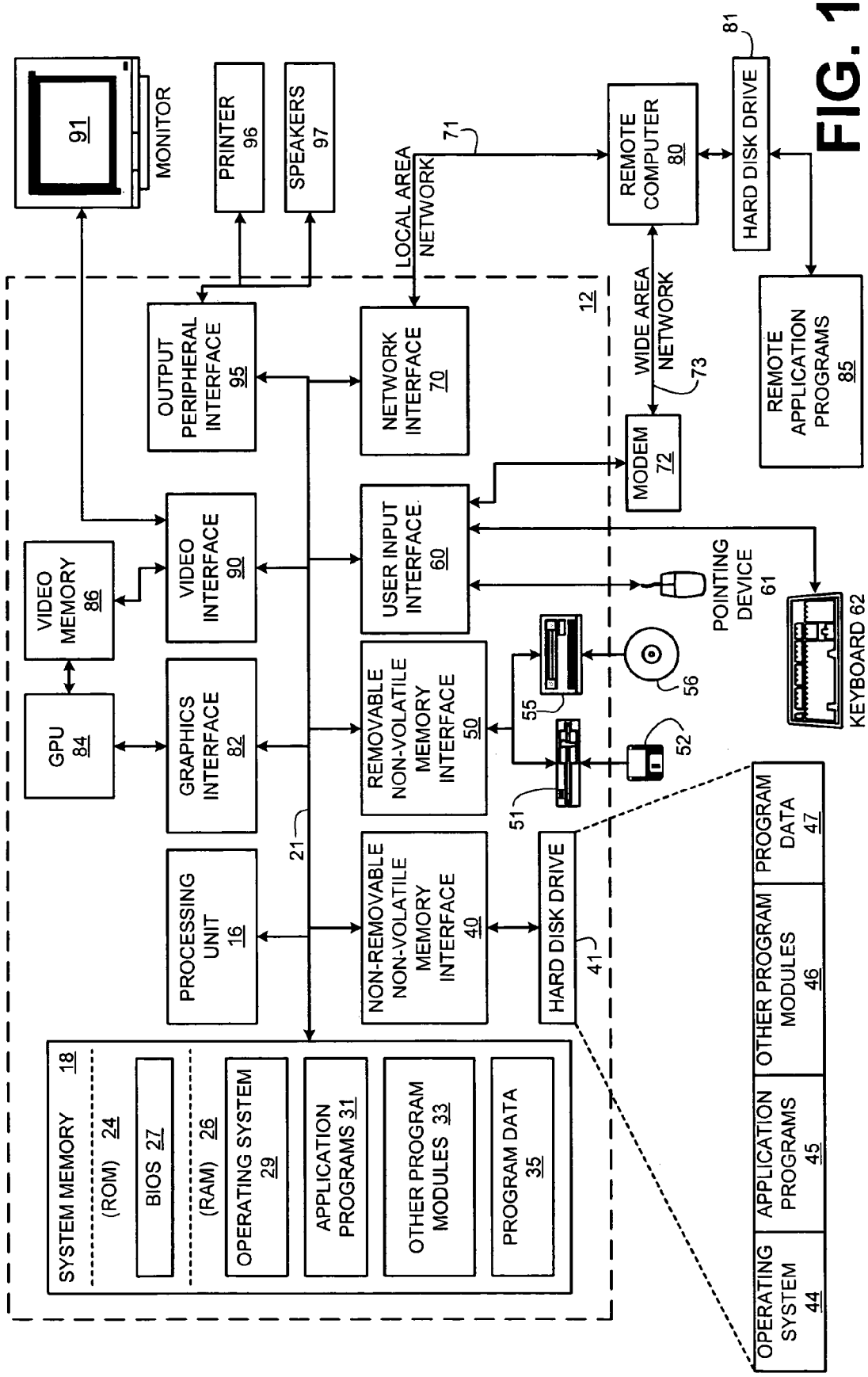
FIG. 1. is a diagram illustrating an exemplary nonlimiting computing device in which a context switch in a GPU may be implemented.

FIG. 1 is a diagram illustrating an exemplary nonlimiting computing device in which a context switch in a GPU may be implemented. FIG. 1 and the following discussion are intended to provide a brief general description of a suitable computing environment in connection with the disclosure herein. It should be understood, however, that handheld, portable, and other computing devices and computer objects of all kinds may be utilized in association with this disclosure as well. Consequently, while a general purpose computer is described herein, it is but one nonlimiting example, and this disclosure may be implemented in a plurality of additional applications, as one of ordinary skill in the art would know. As an additional nonlimiting example, anywhere that data may be stored or from which data may be retrieved or transmitted to another computer is a desirable, or suitable, environment for operation of the techniques, as disclosed herein.

This disclosure may be implemented by an operating system as a nonlimiting example, for use by a developer of services of a device or object, and/or included within application software that operates in connection with the techniques described herein. Software may be described or represented in the general context of computer executable instructions, such as program modules, being executed by one or more computers, such as client workstations, servers, or other devices. Program modules may include routines, programs, objects, components, data structures, and the like that perform a particular task or implement particular abstract data types, as one of ordinary skill in the art would know. The functionality of program modules may be combined or distributed as desired in various configurations.

Other well-known computing systems, environments, and/or configurations that may be suitable for use with this disclosure include, but are not limited to, personal computers (PCs), automated teller machines (ATMs), server computers, handheld or laptop devices, multiprocessor systems, microprocessor based systems, programmable consumer electronics, network PCs, appliances, lights, environmental control elements, minicomputers, mainframe computers, and the like. This disclosure may be applied and distributed in computing environments where tasks are performed by remote processing devices that are coupled via communication networks/buses or another data transmission medium. In a distributed computing environment, program modules may be located in both local and remote computer storage media, including memory storage devices, and client nodes may in turn behave as server nodes.

The computing system 10 of FIG. 1 includes a computer 12. The components of the computer 12 may include, as nonlimiting examples, a processing unit 16, a system memory 18, and a system bus 21 that couples various system components, including the system memory 18, to the processing unit 16. The system bus 21 may be any of several types of bus structures, as one of ordinary skill in the art would know, including a memory bus or memory controller, a peripheral bus, and a local bus using any of a variety of bus architectures. As a nonlimiting example, such architectures may include a peripheral component interconnect (PCI) bus, accelerated graphics port (AGP), and/or PCI Express bus.

Computer 12 may include a variety of computer readable media. Computer readable media can be any available media that can be accessed by computer 12 and includes both volatile and nonvolatile memory, removable and nonremovable memory. As a nonlimiting example, computer readable media may comprise computer storage media and communication media. Computer storage media may include both volatile and nonvolatile, removable and nonremovable media implemented in any method or technology for storage such as computer readable instructions, data structures, program modules, or other data, as one of ordinary skill in the art would know. Computer storage media includes, as nonlimiting examples, RAM, ROM, EEPROM, flash memory, or other memory technology, CDROM, digital versatile disks (DVD) or other optical disk storage disks, magnetic cassettes, magnetic tape, magnetic disk storage, or other magnetic storage devices, or any other medium that can be used to store desired information and which can be accessed by computer 12.

The system memory 18 may include computer storage media in the form of volatile and/or nonvolatile memory, such as read only memory (ROM) 24 and random access memory (RAM) 26. A basic input/output system 27 (BIOS), containing the basic routines that may help to transfer information between elements within computer 12, such as during startup, may be stored in ROM 24. RAM 26 may contain data and/or program modules that are accessible to and/or presently being operated on by processing unit 16. As a nonlimiting example, operating system 29, application programs 31, other program modules 33, and program data 35 may be contained in RAM 26.

Computer 12 may also include other removable/nonremovable volatile/nonvolatile computer storage media. As a nonlimiting example, a hard drive 41 may read from or write to nonremovable, nonvolatile magnetic media. A magnetic disk drive 51 may read from or write to a removable, nonvolatile magnetic disk 52. An optical disk drive 55 may read from or write to a removable, nonvolatile optical disk 56, such as a CDROM or other optical media. Other removable/nonremovable volatile/nonvolatile computer storage media that can be used in the exemplary computing system 10 include, but are not limited to, magnetic tape cassettes, flash memory cards, DVDs, digital video tape, solid state RAM, solid state ROM, and the like.

Hard disk drive 41 may typically be connected to bus system 21 through a nonvolatile memory interface such as interface 40. Likewise, magnetic disk drive 51 and optical disk drive 55 may be connected to bus system 21 by removable memory interface, such as interface 50. The drives and their associated computer storage media described above and shown in FIG. 1 may provide storage of computer readable instructions, data structures, program modules, and other data for computer 12. As a nonlimiting example, hard disk drive 41 is illustrated as storing operating system 44, application programs 45, other program modules 46, and program data 47. These components may either be the same as or different from operating system 29, application programs 31, other program modules 33, and/or program data 35. At least in this nonlimiting example described herein as shown in FIG. 1, these components of software are given separate reference numerals to at least illustrate that they are different copies.

A user may enter commands and information into computer 12 through input devices such as keyboard 62 and pointing device 61. These devices are but nonlimiting examples, as one of ordinary skill in the art would know. Keyboard 62 and pointing device 61, however, may be coupled to processing unit 16 through a user input interface 60 that is coupled to system bus 21. However, one of ordinary skill in the art would know that other interface and bus structures such as a parallel port, game port, or a universal serial bus (USB) may also be utilized for coupling these devices to the computer 12.

A graphics interface 82 may also be coupled to the system bus 21. As a nonlimiting example, the graphics interface 82 may be configured as a chip set that communicates with the processing unit 16, and assumes responsibility for accelerated graphics port (AGP) or PCI-Express communications. One or more graphics processing units (GPUs) 84 may communicate with the graphics interface 82. As a nonlimiting example, GPU 84 may include on-chip memory storage, such as register storage and cache memory. GPU 84 may also communicate with a video memory 86, wherein application variables, as disclosed herein may have impact. GPU 84, however, is but one nonlimiting example of a coprocessor, and thus a variety of coprocessing devices may be included with computer 12.

A monitor 91 or other type of display device may be also coupled to system bus 21 via video interface 90, which may also communicate with video memory 86. In addition to monitor 91, computer system 10 may also include other peripheral output devices, such as printer 96 and speakers 97, which may be coupled via output peripheral interface 95.

One of ordinary skill in the art would know that computer 12 may operate in a networked or distributed environment using logical connections to one or more remote computers, such as remote computer 80. Remote computer 80 may be a personal computer, a server, a router, a network PC, a pier device, or other common network node. Remote computer 80 may also include many or all of the elements described above in regard to computer 12, even though only memory storage device 81 and remote application programs 85 are depicted in FIG. 1. The logical connections depicted in FIG. 1 include a local area network (LAN) 71 and a wide area network (WAN) 73, but may include other network/buses, as one of ordinary skill in the art would know.

In this nonlimiting example of FIG. 1, remote computer 80 may be coupled to computer 12 via LAN connection 71 and network interface 70. Likewise, a modem 72 may be used to couple computer 12 (via user input interface 60) to remote computer 80 across WAN connection 73.

As stated above, the GPU 84 may be configured to switch processes, or contexts, during the processing of another context, or operation. In this instance, the GPU 84 is configured to save an interrupted context and to initiate processing of another context, which itself may have been previously interrupted and saved.

Figure 2:
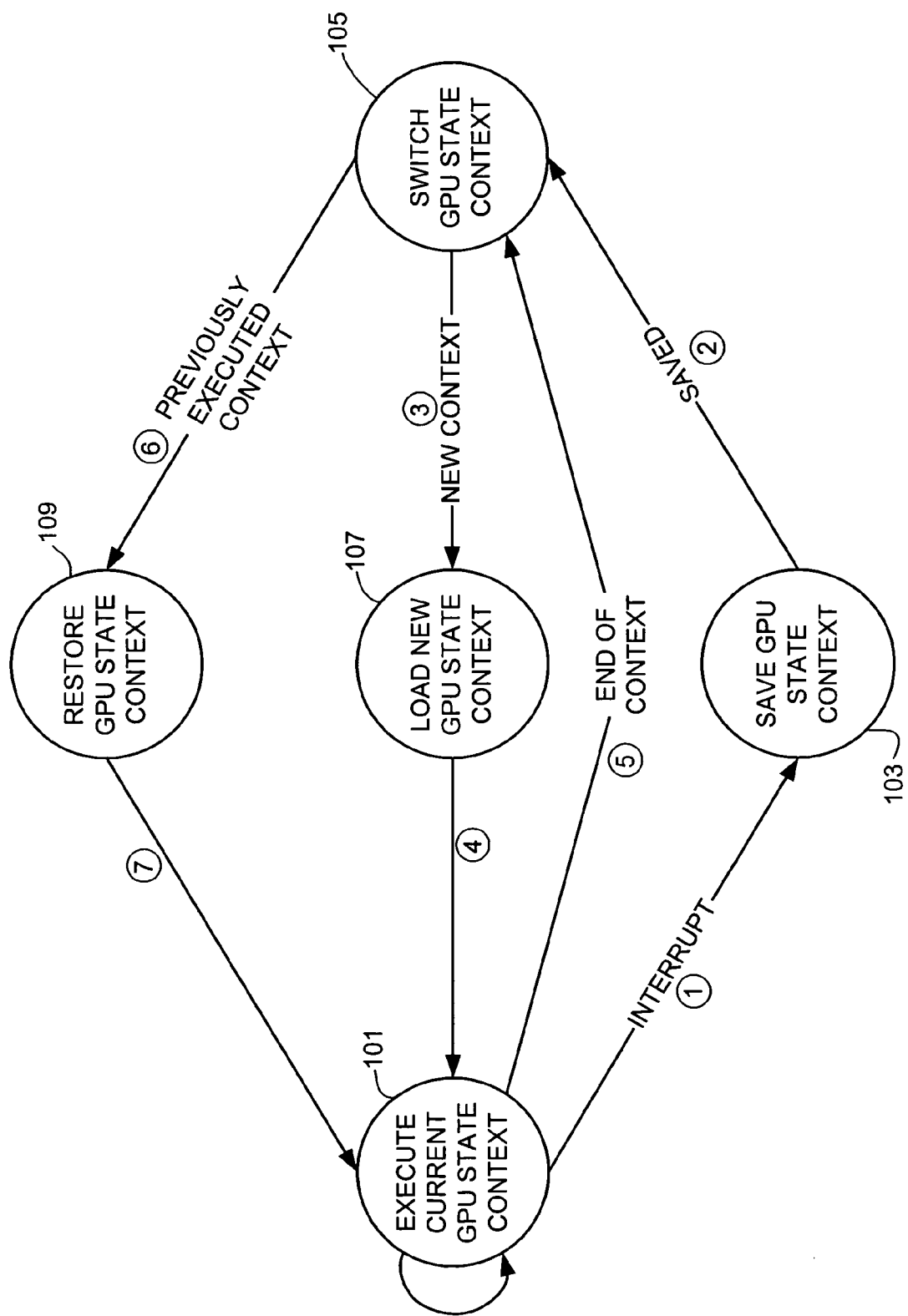
FIG. 2 is a diagram depicting the major states of a context switch process that may be implemented by the GPU of FIG. 1.

In regard to saving state context states and restoring previously saved context states, FIG. 2 is an illustration of the major states of a context switch process that may be implemented by GPU 84. At stage 101, GPU 84 may be configured to execute a current GPU state context in regard to a given operation. However, as shown in a first step, the processing unit 16 may communicate an interrupt command or event so that GPU 84 operates to save the GPU state context, as shown in stage 103. (The method for effectuating the interrupt command or event is described in detail below.) Thereafter, the GPU state context is saved as in step 2, as the GPU 84 switches GPU state context, as shown in stage 105. GPU 84 may then implement the third step to load a new GPU state context, as depicted in stage 107. Thereafter, GPU 84 implements step 4 to return to stage 101 to execute this newly loaded GPU state context.

When the GPU 84 completes execution of this newly loaded GPU state context, a fifth step is implemented at the end of the newly loaded context so that the GPU 84 returns to stage 105 to switch GPU state context back to the previously executed context, as shown in step 6. In so doing, the GPU 84 moves to stage 109 to restore the GPU state context previously saved in step 2, as described above. Thereafter, in step 7, the GPU 84 returns to stage 101 to execute this newly restored GPU state context at the point where it left off prior to receiving the interrupt command in step 1.

GPU 84 is configured according to FIG. 2 to support sequential execution of multiple GPU programs (commands) belonging to the same context that have also the name of the "ring buffer," which comprises processor functions and command DMA buffer pointers in memory. As described above, the GPU 84 switches from one context to another upon receipt of an interrupt command and also at the end of the ring buffer, as corresponding to steps 1 and 5, respectively. In the case of the interrupt command, the GPU 84 saves the state context so that it is able to continue execution of that context subsequent in time at the precise point saved.

Figure 3:
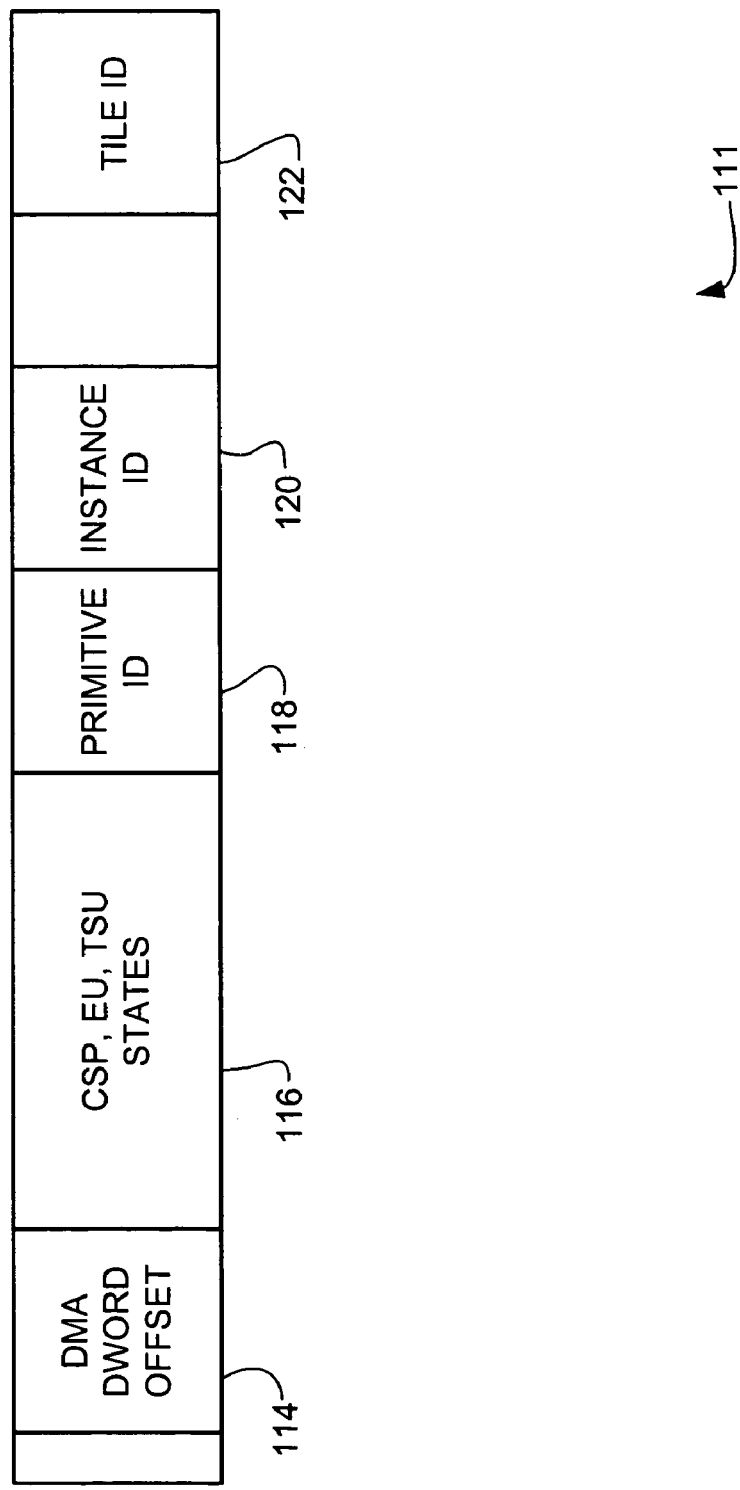
FIG. 3 is a diagram of the context save data structure that may be implemented in the context switch process of FIG. 2

FIG. 3 is a diagram of a context saved data structure 111 that may be implemented in FIG. 2. These states of the architecture units saved in the context saved data structure 111 may define the status of the units at the moment of, the interrupt. The context saved data structure 111 may include several fields, such as a DMA word offset pointer 114, a primitive ID 118, an instance ID 120, and a tile ID 122 of an interrupted DRAW command. Context saved data structure 111 may also include various commands of a stream processor, execution unit, tile shader unit, and other processor unit states 116. These states of the architecture units saved in the context saved data structure 111 may define the status of the units at the moment of the interrupt. If the GPU 84 maintains such information in ready-to-save form, and later restores all states before restarting context execution, the GPU 84 may be considered to be fully interruptible.

The following constitutes a nonlimiting exemplary list of elements in the state context save data structure 111:

```
typedef struct context_save_area
{
DMA_DW_Offset ;
CSP_Registers CSP [551];     Command Stream Processor Registers
C2D_Registers C2D [13];      Block1 registers
MXU_Registers MXU[19];       Block2 registers
TSU_Registers TSU [163];     Block 3 registers
SG_TG_Registers SG_TG [3];
ZL1_Registers ZL1 [17];
ZL2_Registers ZL2 [21];
Primitive_ID Primitive_ID;
Instance_ID Instance_ID;
Tile_ID Tile_ID;
} context_save_area
```

Figure 4:
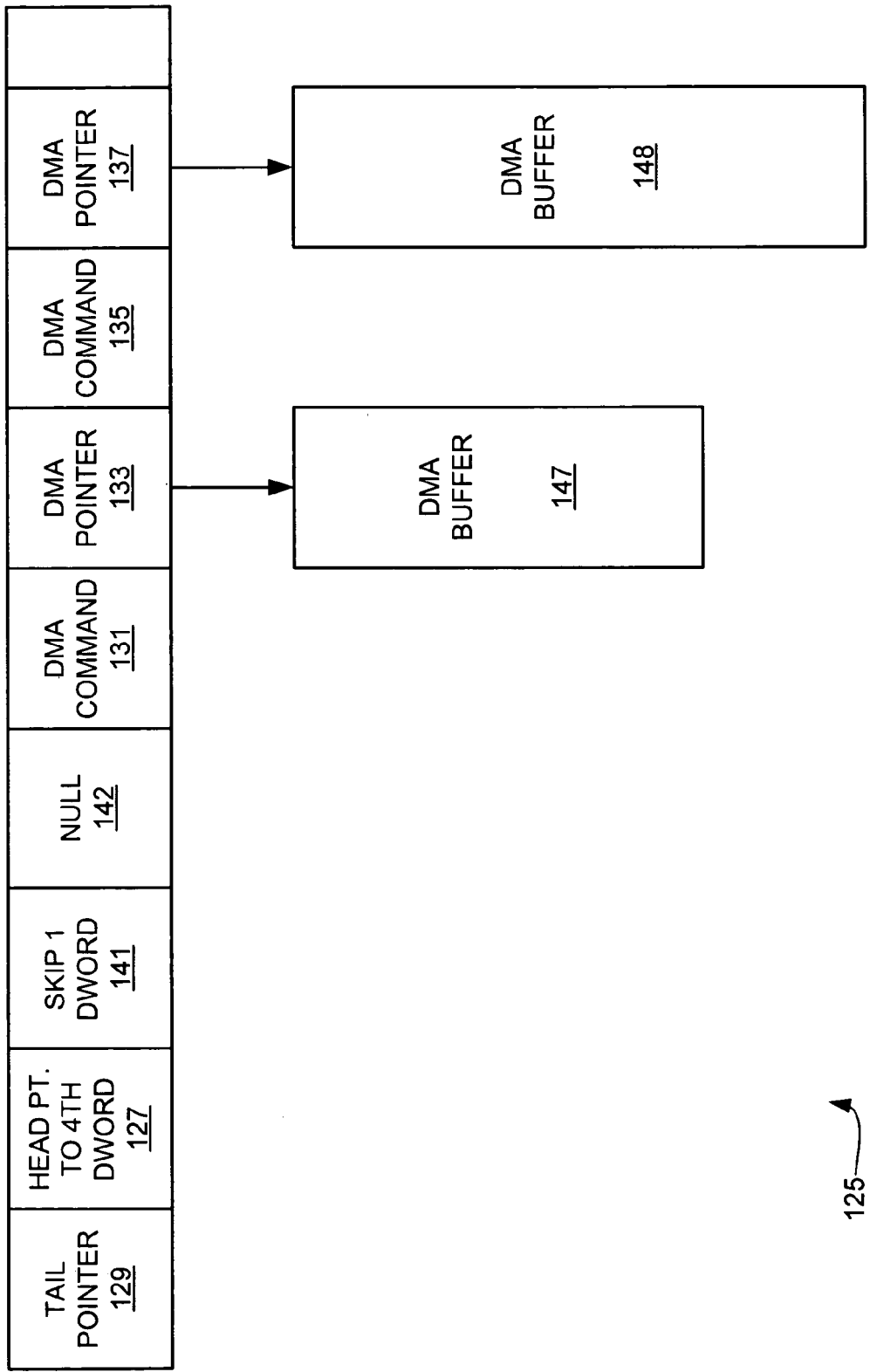
FIG. 4 is a diagram of an initial structure of the ring buffer that may be implemented in FIG. 2 prior to a first save/restore.

FIG. 4 is an illustration of the initial structure of the ring buffer 125 prior to a first save/restore that related to the context switch procedure in FIG. 2. A ring buffer, such as ring buffer 125, may comprise a string of commands and memory pointers associated with the execution of a context. This ring buffer 125 may contain a head pointer slot 127 and a tail pointer slot 129. Head pointer slot 127 contains data regarding the logical location of processing the commands and pointers of the ring buffer 125, and the tail pointer slot 129 stores data compiling to the logical end of the ring buffer 125. The tail pointer slot 129 is updated during the context execution (stage 101 of FIG. 2) when more commands are added to the context.

The ring buffer 125 also contains, in this nonlimiting example, DMA memory command 131 and associated DMA pointer 133 that points to DMA buffer 147, which may contain commands and data related to the context for this ring buffer 125. Additionally, ring buffer 125 may contain DMA commands, such as DMA command 135, and associated DMA pointers, such as pointer 137, that point to a DMA buffer with commands and data, such as DMA buffer 148. Ring buffer 125 of FIG. 4 also contains place holders 141 and 142 which, in this nonlimiting example, is skip 1 DWORD 141 and null position 142 to hold the place for a context save command and address pointer, respectively, after a save/restore operation, as described below.

In application, when GPU 84 begins to execute the ring buffer 125, GPU 84 receives both head pointer 127 and tail pointer 129 and checks for a saved context. Placeholder 141, which, in this nonlimiting example, is configured as a skip 1 DWORD, which causes the GPU 84 to skip, or ignore, null 142 to the next command, which is DMA command 131. In this instance, the ring buffer 125 is not interrupted at this point, and GPU 84 otherwise continues to execute the commands and instructions of ring buffer 125 of FIG. 4 and also the contents of DMA buffers 147 and 148 (such as draw commands, primitives, instances, and tiles).

Figure 5:
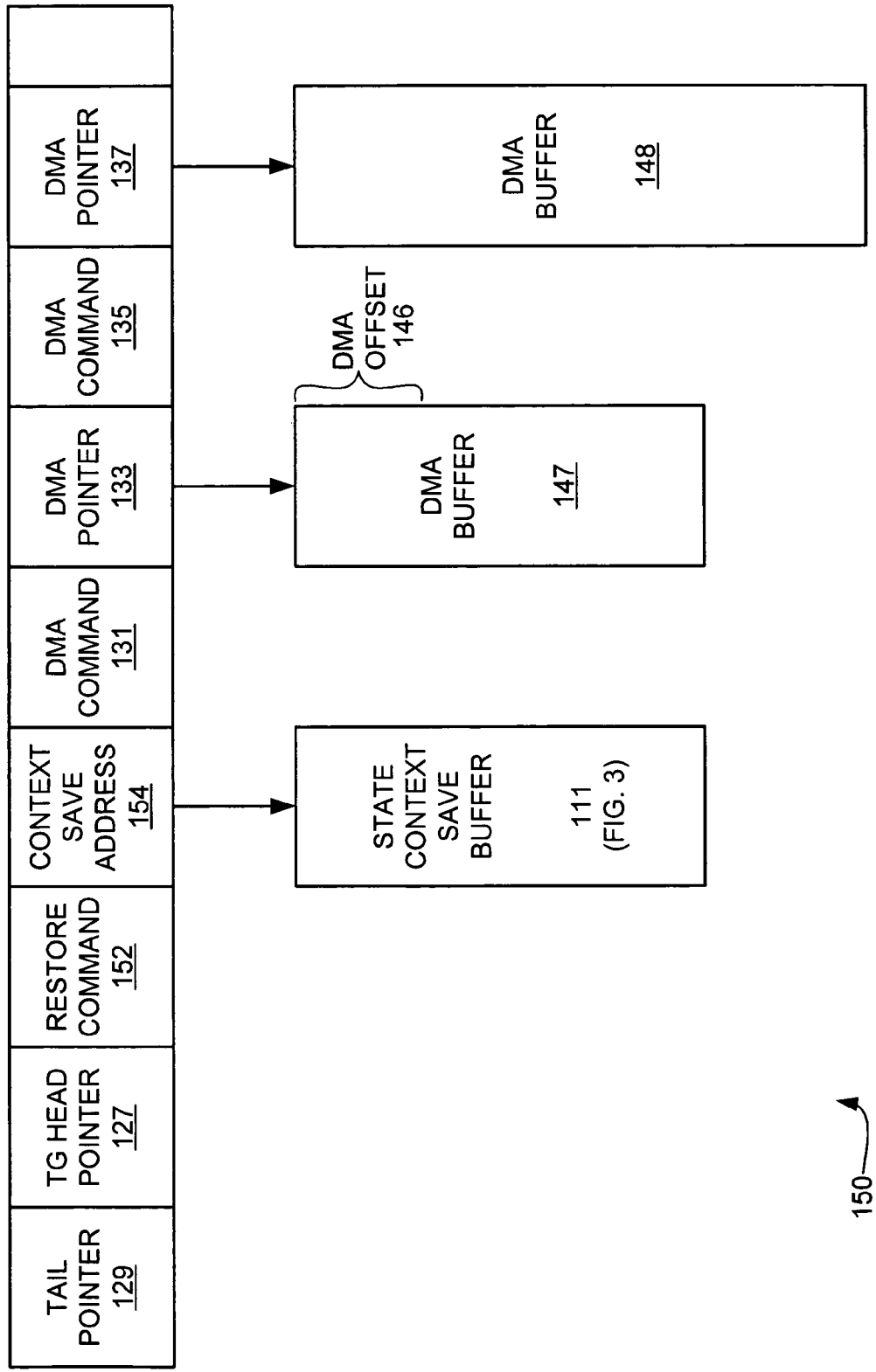
FIG. 5 is a diagram of the ring buffer structure of FIG. 4 after a save/restore context operation as also shown in FIG. 2.

FIG. 5 is a diagram of a ring buffer 150 after a save/restore context operation has been implemented, as shown in FIG. 2. In this nonlimiting example, the placeholders 141 and 142 of the ring buffer 125 in FIG. 4 are replaced by a restore command 152 and context save address 154, which point to a state context save buffer 111 (as shown in FIG. 3).

As the GPU 84 processes the ring buffer 150 of FIG. 5, upon recognizing restore command 152, GPU 84 acknowledges the context save address 154 of a previous run state context that should be retrieved from state context save buffer 111. Data retrieved from state context save buffer 111, as discussed above, may also provide a DMA offset 146 for DMA buffer 147 so that processing can resume at the precise point interrupted.

Figure 6:
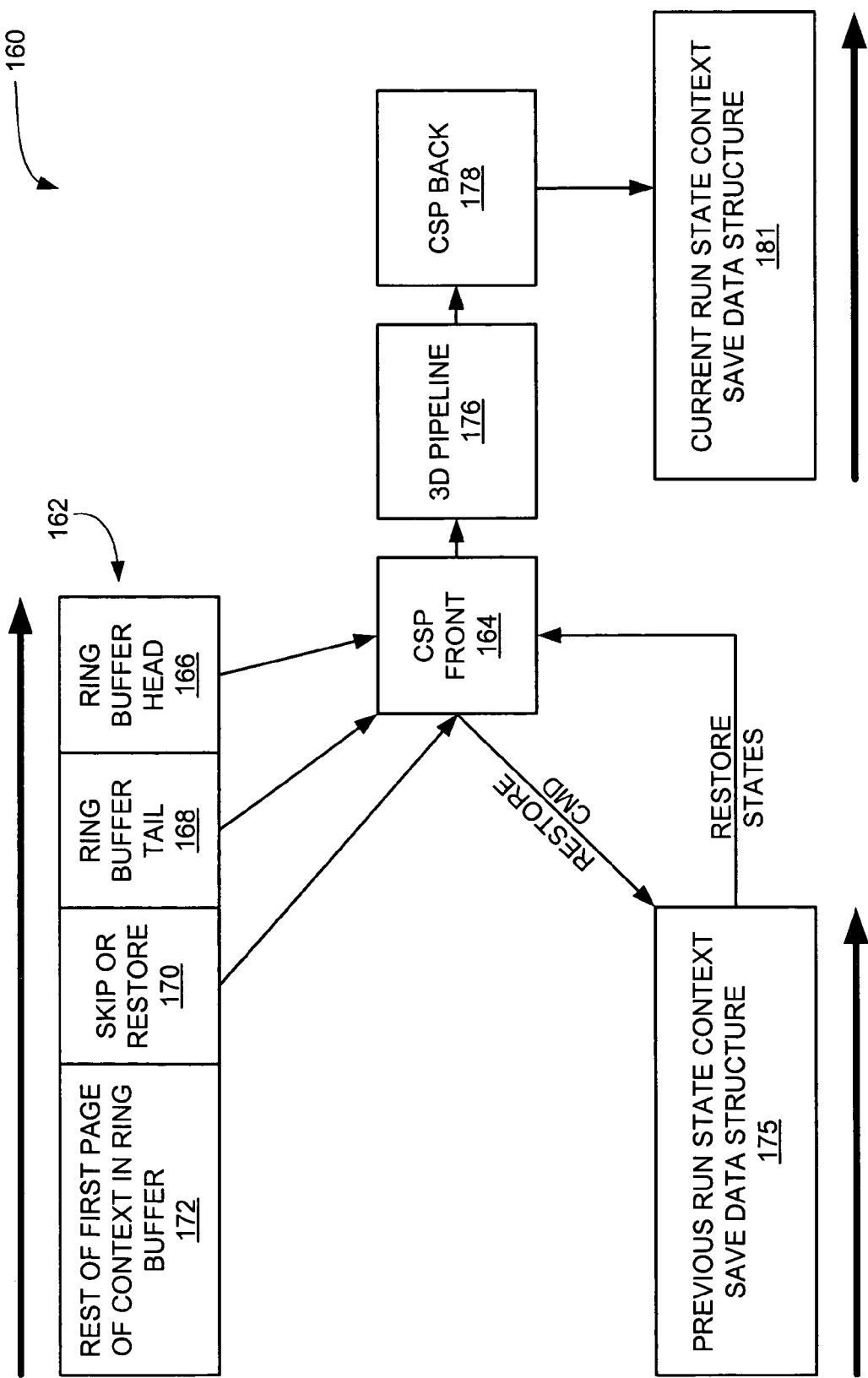
FIG. 6 is a diagram of a ring buffer structure of FIG. 4 or FIG. 5 being executed by the GPU, as shown in FIG. 1.

FIG. 6 is a diagram 160 of a ring buffer structure 162 being executed by architectural components of the GPU 84, as shown in FIG. 1 and also described in more detail below. Ring buffer 162, which may be similar to ring buffers 125 (FIG. 4) or 150 (FIG. 5), includes a ring buffer head pointer 166 and ring buffer tail pointer 168. A skip or restore pointer 170 may follow ring buffer tail pointer 168 (as similarly shown in FIGS. 4 and 5 as references 141 and 152, respectively), as well as a remaining portion of the context 172 in the ring buffer 162. The remaining portion of context 172 may include one or more DMA commands and pointers, as described above.

Figure 7:
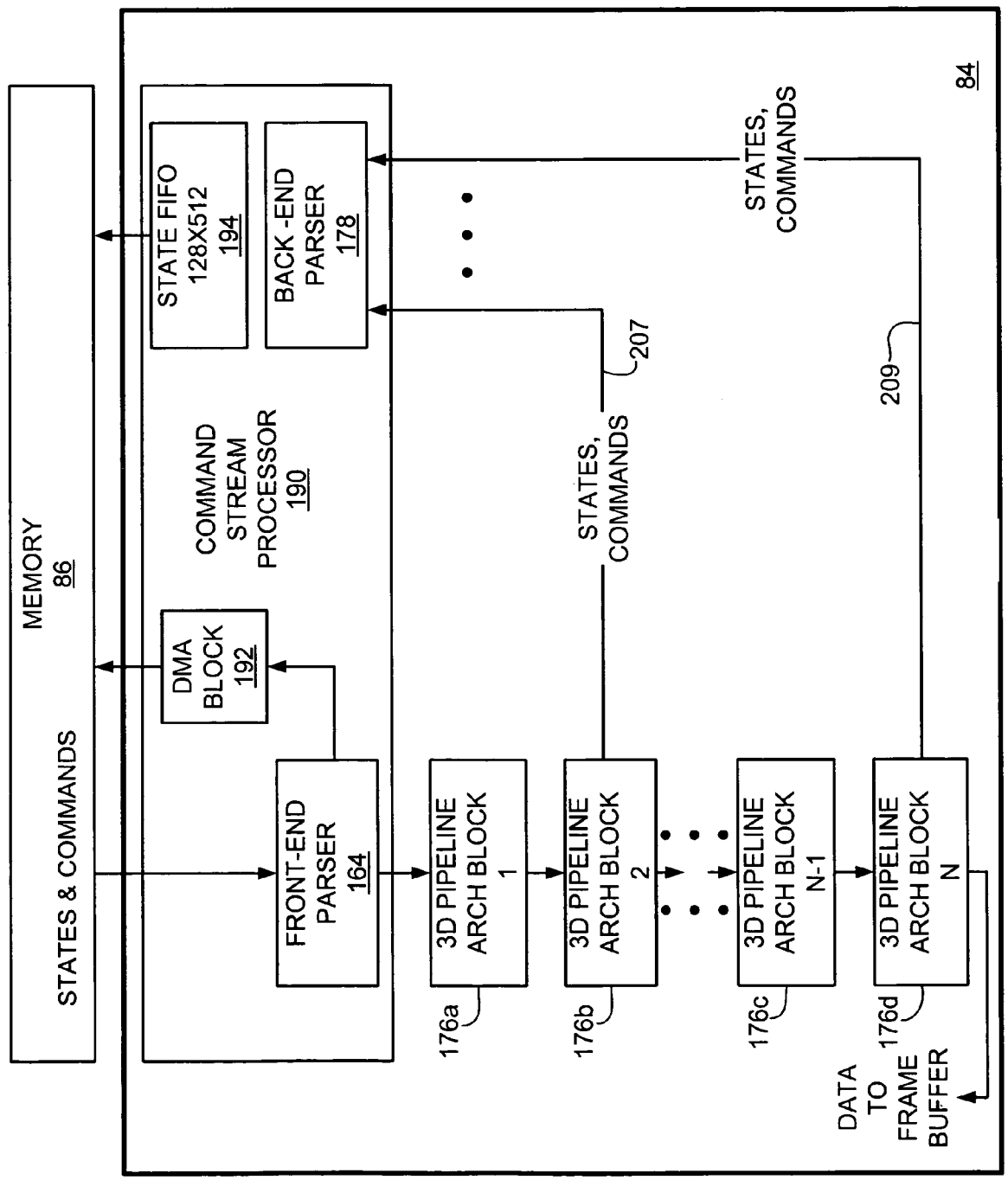
FIG. 7 is a diagram of a portion of the architecture of the GPU of FIG. 1 that may be included in saving and restoring states, as described in regard to FIG. 6.

The GPU 84 may include a command stream processor 190, as shown in FIG. 7 and described below. The command stream processor ("CSP") 190 may be configured to include a pair of parsers, including a front-end parser 164 and a back-end parser 178, which communicate with a 3D pipeline 176.

CSP front-end parser 164 may begin to parse the ring buffer 162 such that it receives head and tail pointers 166, 168. Thereafter, CSP front-end parser 164 may check for a saved context according to whether command pointer 170 is a skip or restore command. If the command 170 is a skip command, this indicates that ring buffer 162 was not previously interrupted. Thus, CSP 190 executes the remaining portion of the context 172, which may include one or more DMA commands and pointers. If, however, the CSP front-end parser 164 recognizes command 170 as a restore command, such as restore command 152 in FIG. 5, the restore command is executed so that the previous run state context save data structure 175 is retrieved, as shown in FIG. 6, and restored at CSP front-end parser 164. Thereafter, this restored context is executed by 3D pipeline 176 and forwarded to CSP back-end parser 178, which operates on it as the current run state save context data structure 181.

FIG. 7 is a diagram of a portion of the architecture of GPU 84 that may be included in saving and restoring states, as described in regard to FIG. 6. GPU 84 may include the command stream processor ("CSP") 190 that has a front-end parser 164 and back-end parser 178, all as described above. These devices coordinate instructions for processing by the 3D pipeline 176. A DMA block 192 may access memory 186 for retrieving states and commands that are communicated to front-end parser 164. A memory 194, which in this nonlimiting example is a state FIFO 128×512, may also be included with CSP 190 for receiving states and commands from back-end parser 178.

The 3D pipeline 176 of FIG. 6 may be further represented by the 3D pipeline architectural blocks 176a-176d, as shown in FIG. 7. These 3D pipeline architectural blocks 176 may, in one nonlimiting example, be represented by a tile shade unit, shade generator unit, tile generator, etc., as one of ordinary skill in the art would know. (See FIG. 10).

To prepare all states for saving when an interrupt command is received, each 3D pipeline architectural block 176 may be configured to forward a copy of its state command to the CSP 190. Upon receipt of each architecture block's 176 state command, the CSP 190 may write this information in a state FIFO 128×512 (reference 194) and later into memory 86 until subsequently restored, as described above. In at least one nonlimiting example, the 3D pipeline architectural blocks 176b and 176d are configured to include data paths 207, 209 to back-end parser 178 of the CSP 190. Although discussed in more detail below, not every 3D pipeline architectural block 176 includes a data path to back-end parser 178, as the paths 207, 209 may share data from multiple blocks 176. However, these paths 207, 209 enable GPU 84 to save data mid-processing so that one context may be interrupted and another begun.

Data paths 207 and 208 between architectural blocks 176b and 176d, respectively, are the two data paths shown in this nonlimiting example. Stated another way, at least one nonlimiting example provides that each architectural block in the 3-D pipeline 176 does not have a dedicated data path back to back-end parser 78. Thus, the data path to copy the state entry of each architectural block 176 to the state FIFO 194 can be dedicated or shared for several 3D pipeline architecture blocks 176. Because state changes may occur relatively infrequently, it may be more economical or desirable to share the data path 207, 209 with multiple blocks 176 so as to reduce the overall number of data paths between the 3-D pipeline 176 and CSP back-end parser 178. Stated another way, by having fewer data paths, chip real estate may be preserved for other modules and/or configurations.

Figure 8:
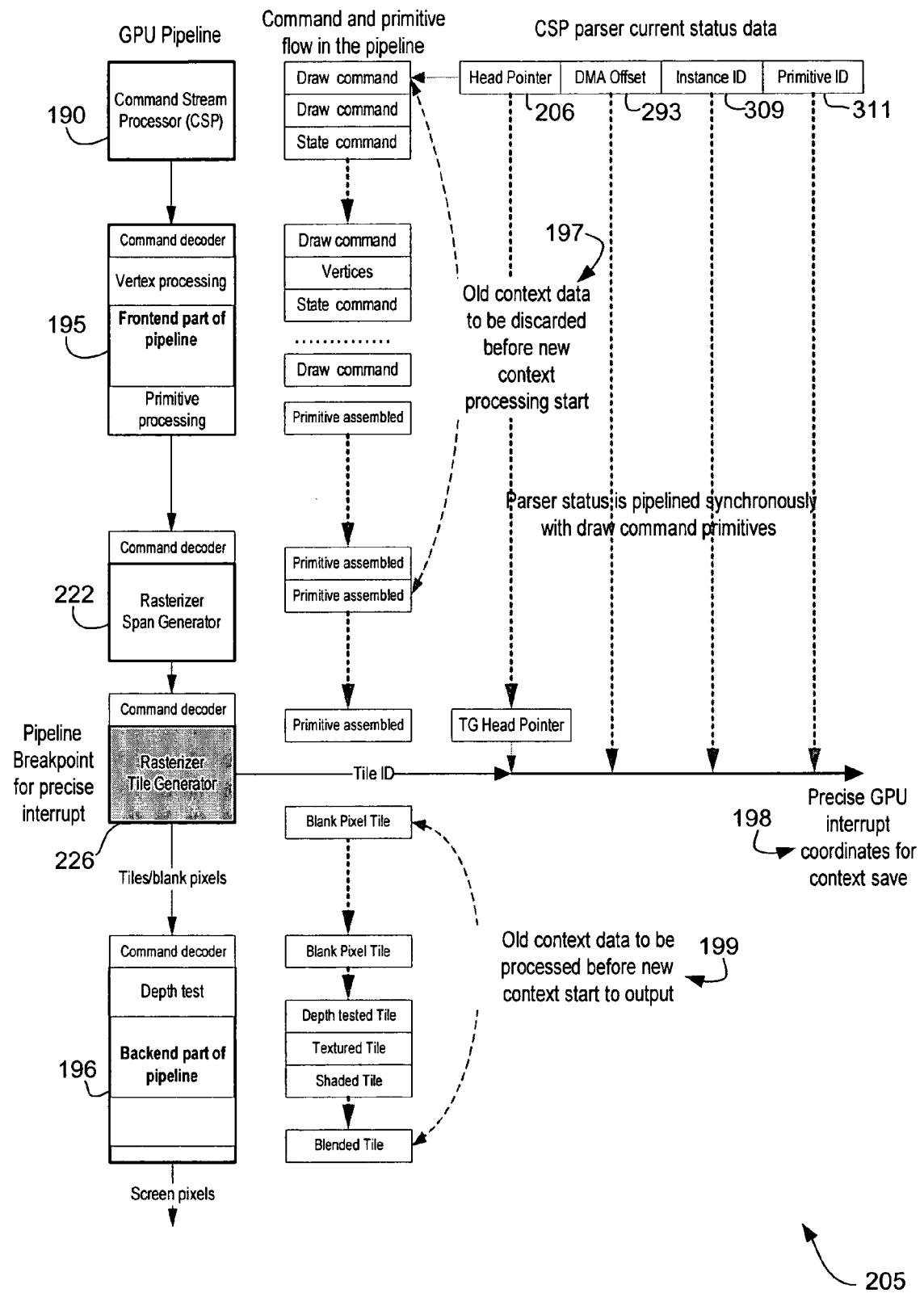
FIG. 8 is a diagram of the 3D pipeline of FIG. 7 depicting the cutoff for saving a portion of an interrupted context and the continued processing of another portion of the interrupted context.
Figure 15:
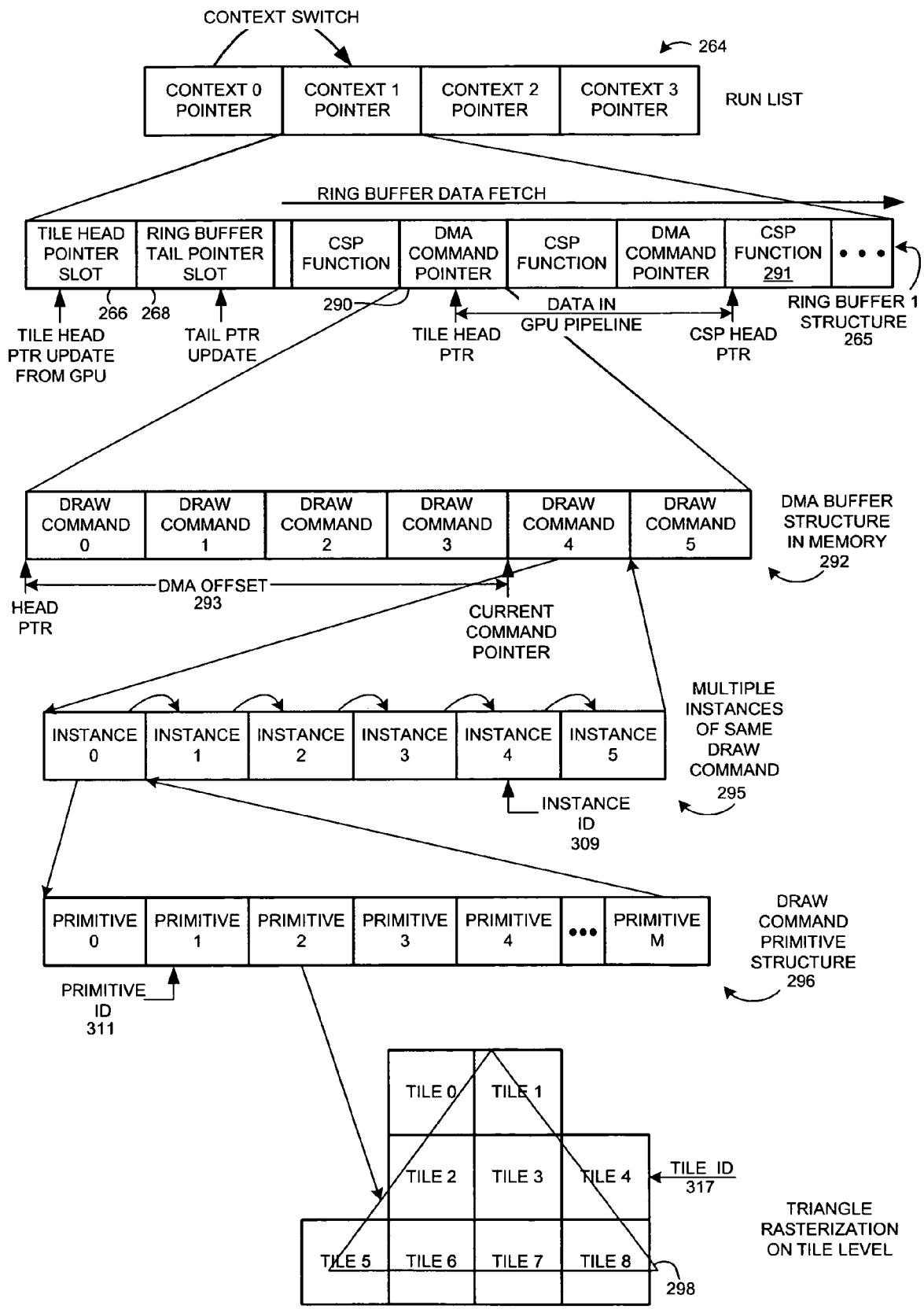
FIG. 15 is an expanded view diagram of the data structure of the contexts and ring buffer of FIG. 12.

FIG. 8 is a diagram 205 depicting the 3D pipeline 176 of FIG. 7 and an operation for interrupting a context so as to retain a precise tile head pointer 206, DMA offset 293 (FIG. 15), instance ID 309 (FIG. 15), and primitive ID 311 (FIG. 15). A front part 195 of the 3D pipeline 176, which may include the triangle setup unit 214 and attribute setup unit 218, may be configured according to process 197 to discard data associated with an interrupted context. Thus, the draw commands, vertices, state commands, assembled primitives, etc. are discarded prior to having reached the tile generator 226, which is further described in step 334 of FIG. 17.

The tile generator 226 may be configured to save the tile ID at the point of interrupt as well as the current head pointer 206, DMA offset 293, instance ID 309, and the primitive ID 311. This process is depicted in FIG. 8 at step 198 and is also described below in greater detail.

In step 199 of FIG. 8, the back end part 196 of the 3D pipeline 176 continues to process data related to the old context so that a certain amount of the old context is drained through the pipeline 176 via normal processing. Thus, at least a portion of the old context is completed at the receipt of an interrupt operation.

Figure 9:
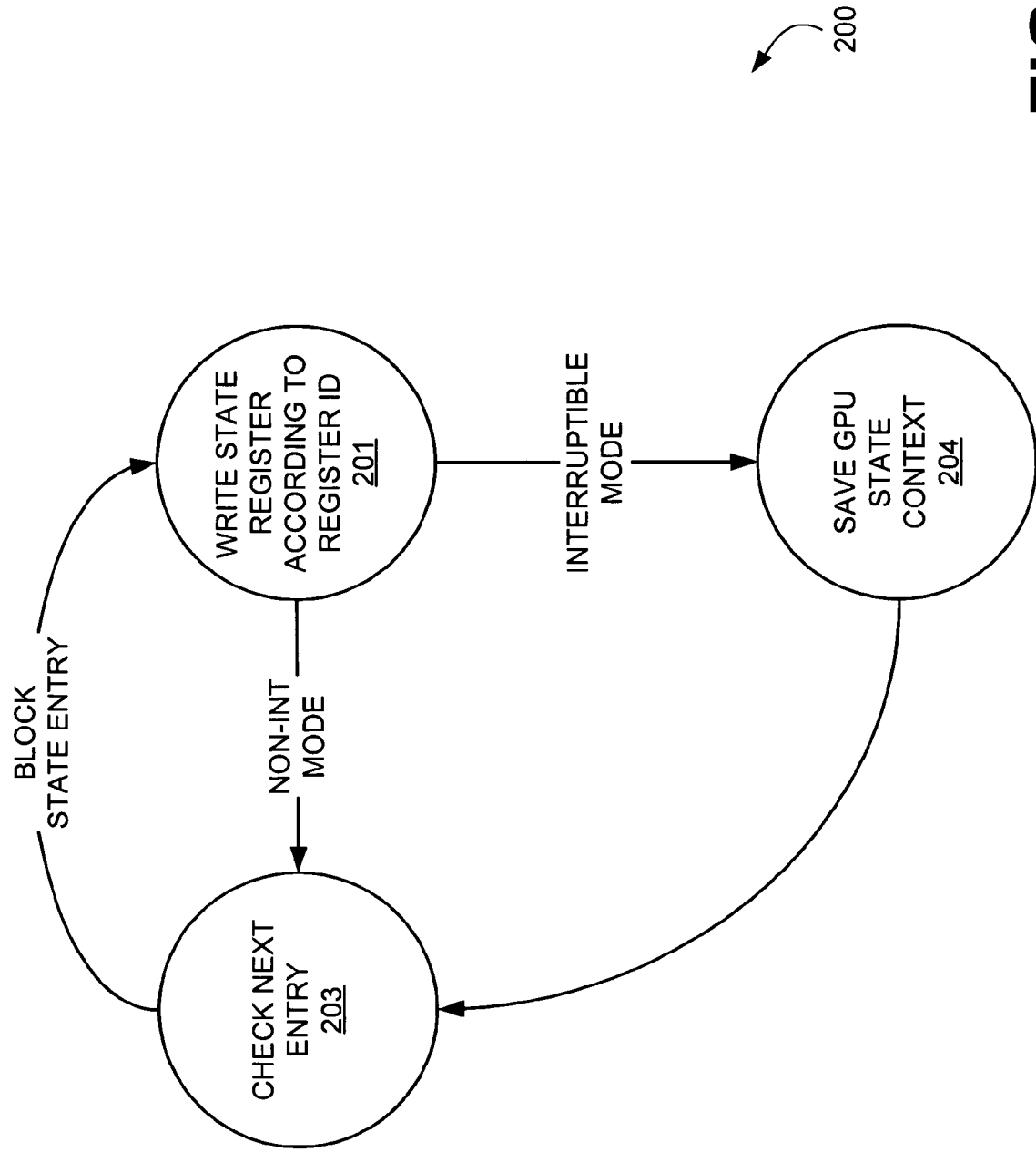
FIG. 9 is a flowchart diagram depicting the flow of saving states and writing the state commands to the command stream processor ("CSP") of FIGS. 7 and 8.

FIG. 9 is a flowchart diagram 200 depicting the flow of saving states and writing the state commands to the CSP 190 of FIGS. 7 and 8. During normal processing operations, the 3D pipeline architectural blocks 176 operate at stage 201, which directs the architectural blocks 176 to write to state the register according to the register ID. So in noninterrupt mode, each 3D pipeline architectural block 176 moves from stage 201 to 203 to check for the next entry. Upon receiving the block state entry, a 3D pipeline architectural block 176 may again perform stage 201 if an interrupt is not received at the architectural block.

However, if the CSP 190 does receive a command switching to the interruptible mode of a currently processed context, the 3D pipeline architectural blocks 176 move to stage 204 so as to save the current state context executed by the GPU 84 (see step 103 of FIG. 2). Thereafter, the architectural block 176 returns to stage 203 to check for the next entry and continues to operate as described above.

In this event, the 3D pipeline architectural blocks 176 operate to establish a context saved data structure 111 (FIG. 3) by forwarding state data to the CSP 190 via data paths 207 and 209. Blocks 176a and 176c may forward such data to blocks 176b and 176d, respectively, which each forward the data received to the back-end parser 178 via data paths 207 and 209.

Figure 10:
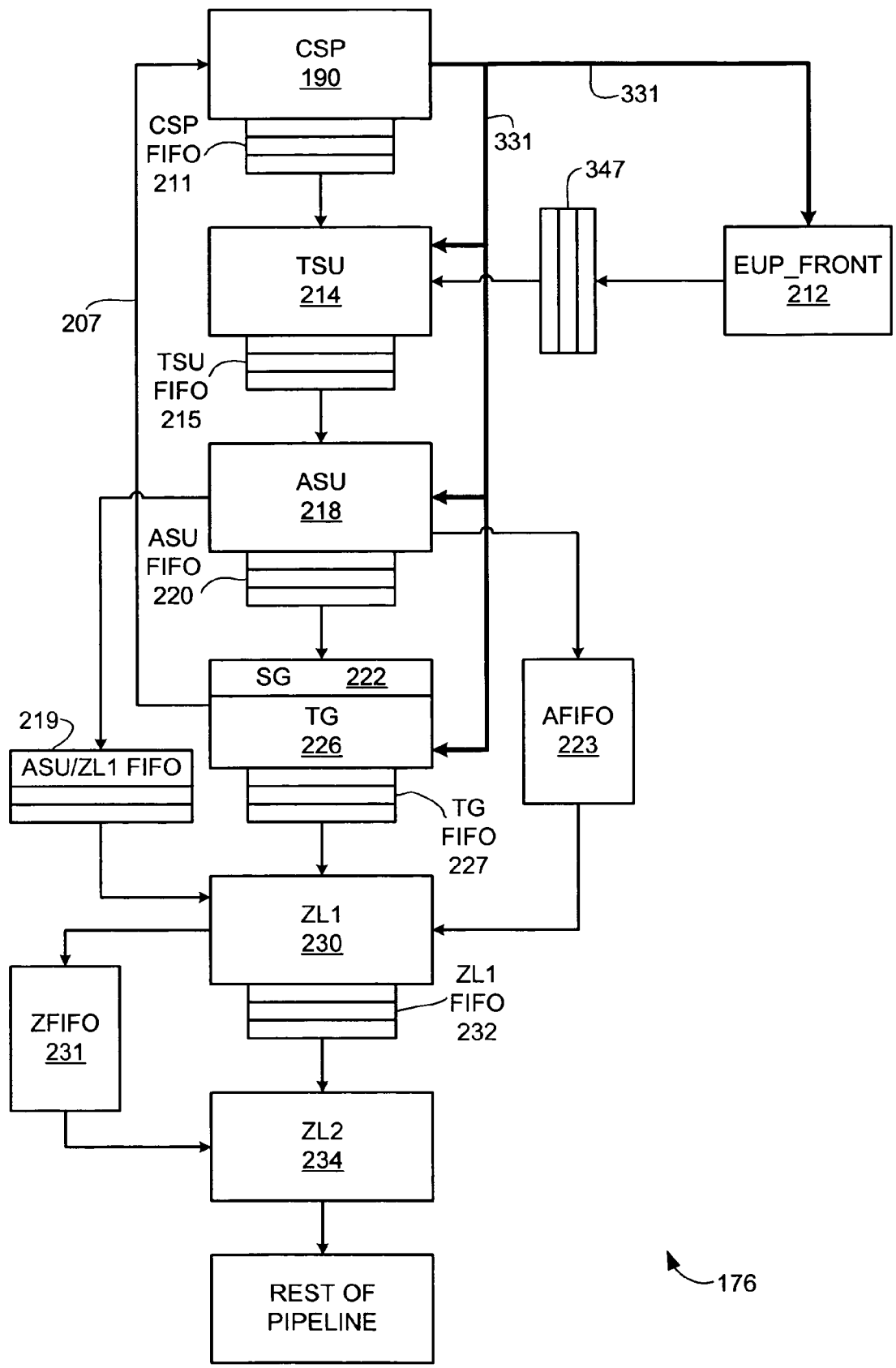
FIG. 10 is a nonlimiting exemplary diagram of the 3D architecture blocks from FIG. 7 for the GPU of FIG. 1.

FIG. 10 is a nonlimiting exemplary diagram of the 3D architecture blocks 176 from FIG. 7 and a more detailed view of the pipeline of FIG. 8. This is but one nonlimiting example of a graphics pipeline, as one of ordinary skill in the art would know, and these blocks could be rearranged or reconfigured to accomplish a similar result without departing from the spirit of this disclosure. As described above, CSP 190 may communicate with the 3-D pipeline architecture blocks 176, which may include a triangle setup unit ("TSU") 214 that receives instructions from a CSP FIFO memory 211. The TSU 214 may communicate processed data to the attribute setup unit ("ASU") 218 by way of TSU FIFO memory 215. The ASU 218 may forward processed data to ASU/ZL1 FIFO 219, span generator unit ("SG") 222 by way of ASU FIFO memory 220, and AFIFO memory (Attribute FIFO) 223.

SG 222 communicates processed data to tile generator unit ("TG") 226. A Z unit level 1 block ("ZL1") 230 receives data from ASU/ZL1 FIFO 219, AFIFO 223, and also TG FIFO 227, which is also coupled to an output of TG 226. ZL1 230 processes data from these sources and communicates an output to a Z unit level 2 block ("ZL2") 234 via ZFIFO 231 and ZL1 FIFO memory 232.

The 3D architecture pipeline (hereinafter "3D pipeline") 176 of FIG. 10 is but one portion of a graphics pipeline, as one of ordinary skill in the art would know. Additionally, a write back unit, a pixel packer, and other logical blocks may be included in a rest of the pipeline 176, as one of ordinary skill in the art would know, but are excluded here for simplicity.

Figure 11:
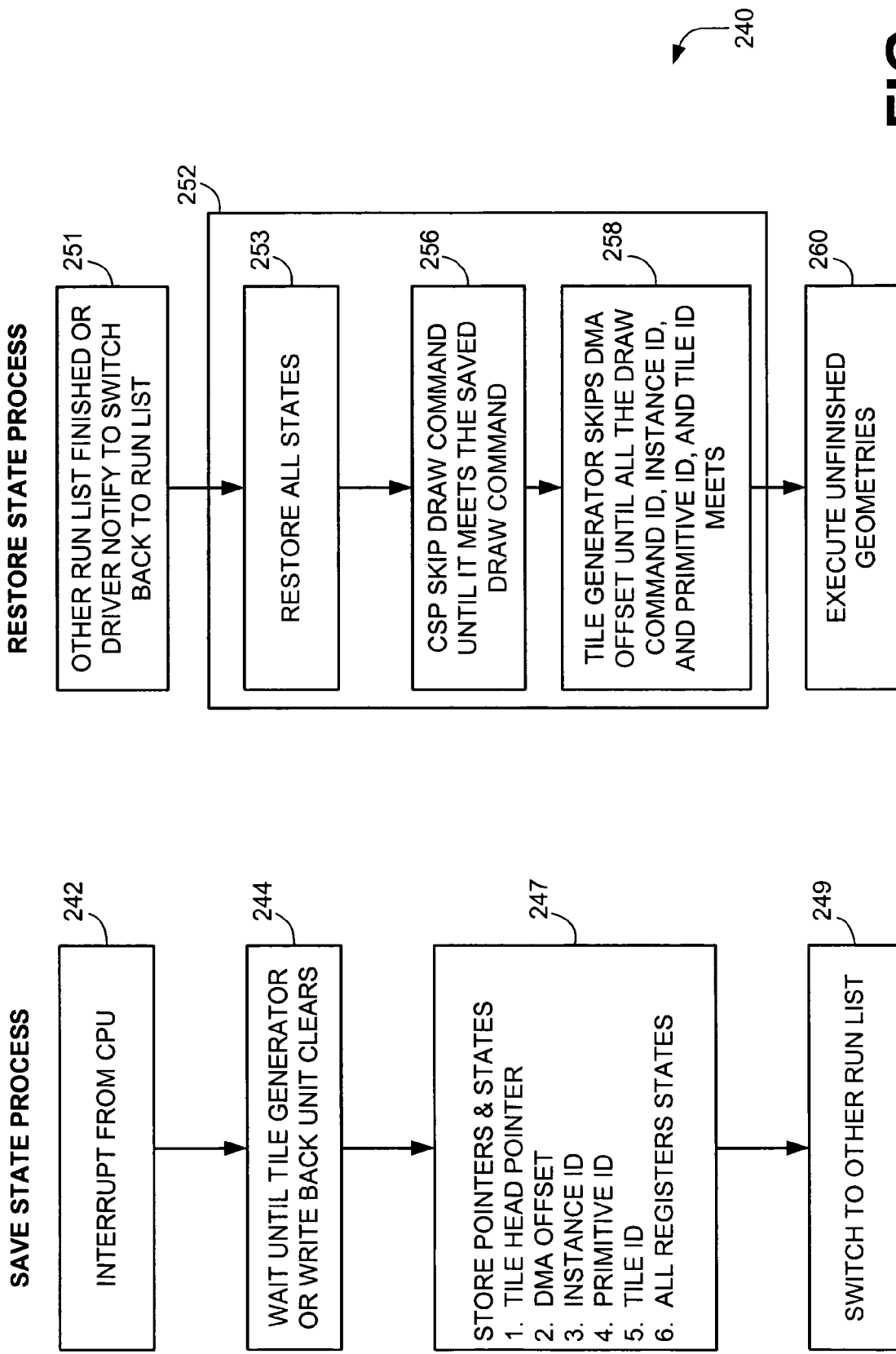
FIG. 11 is a diagram depicting a flowchart for a save and restore process as may be implemented in the 3D graphics pipeline of FIG. 10.

The context save and restore state process described above may be implemented in the 3D pipeline 176 of FIG. 10. FIG. 11 is a diagram 240 depicting a flowchart for a save and restore process as may be implemented in the 3D pipeline 176 of FIG. 10.

For a context save process, when the GPU 84 is processing a context, an interrupt command may be received from the CPU (processing unit 16 of FIG. 1), as shown in step 242. As shown in step 244, 3D pipeline 176 may be configured to wait until the tile generator 226 or a write back unit (not shown in FIG. 10) clears of instructions being executed. The CSP 190 may recognize the tile generator 226 clearing due to the fact that the CSP 190 may send a token through the pipeline every time when the head pointer is changed. The tile generator 226 may communicate the token back to the CSP 190 when the tile generator 226 receives and processes it.

The CSP 190 may further communicate a DMA DWORD OFFSET down the pipeline 176 when the CSP 190 is initiating a draw command or starting states. The tile generator 226 may communicate this DMA DWORD OFFSET to the CSP 190 as well. The tile generator 226 may then communicate back each state when the states are communicated down to the tile generator as described above in regard to FIG. 7 and the data paths 207 and 209.

Block 247 of FIG. 11 describes the states that may be saved as well as the pointers that may be stored upon receipt of the interrupt from the CPU 16 in step 242. When the interrupt is received by the tile generator 226, the tile generator 226 may communicate all 0s for IDs to the CSP 190 if the tile generator 226 is processing states during the interrupt. Otherwise, as shown in step 247, the tile generator 226, in this nonlimiting example, may store the pointers and states including the tile head pointer (DMA Offset), the instance ID, the primitive ID, the tile ID, and all register states so that the context being saved can be quickly restored. This data may comprise and be stored as the context saved data structure 111 of FIG. 3.

Figure 12:
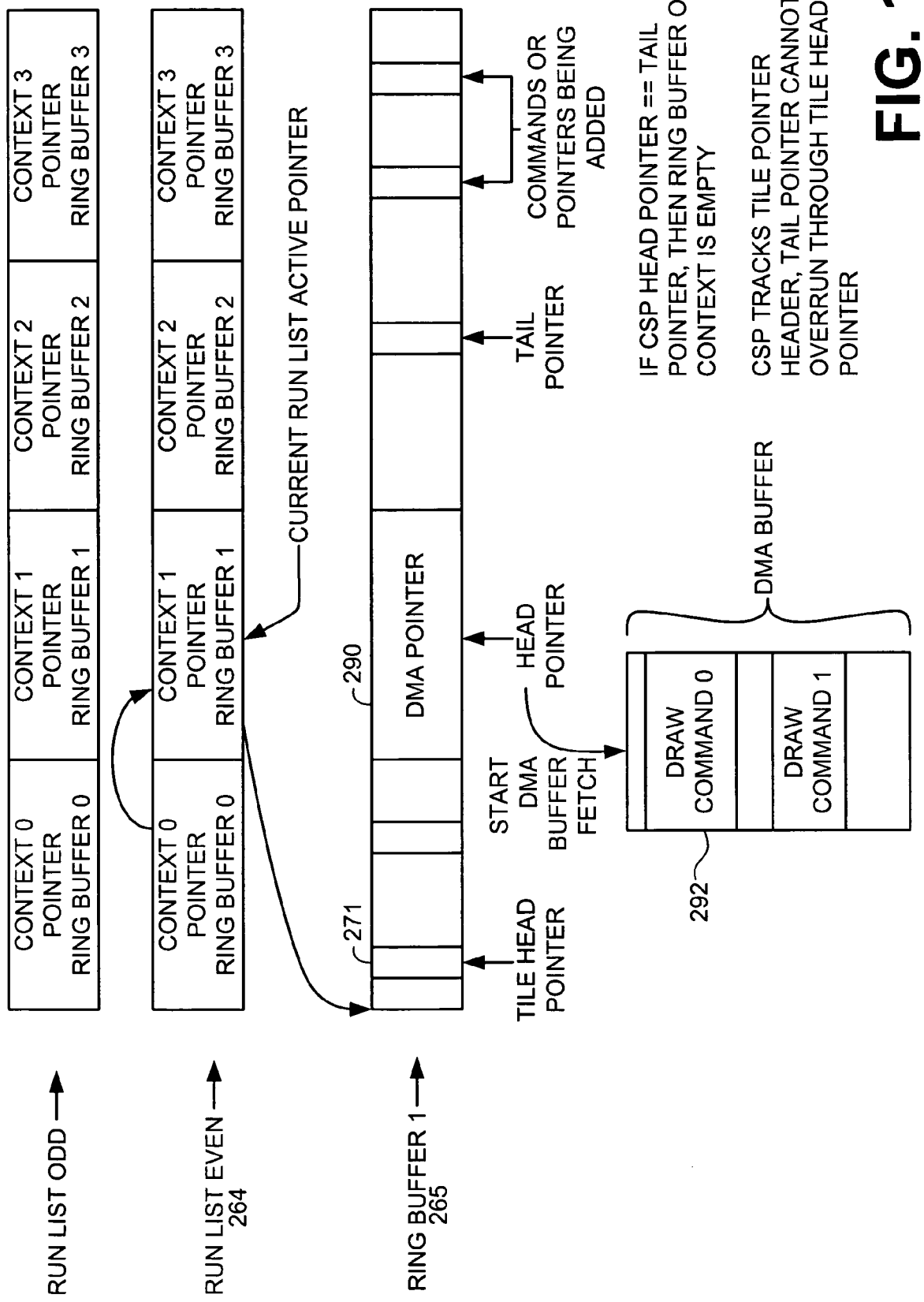
FIG. 12 is a diagram of the run lists that the CSP of FIG. 7 may execute containing a plurality of contexts, each context having its own ring buffer.

Thereafter, the GPU 84 may be configured to switch to another run list, as shown in step 249. The run lists that may be switched to may include one or more other contexts for execution by the 3D pipeline 176, as shown in FIG. 12 below.

For the process flow of restoring a state for execution of the pipeline 176, the GPU 84 may be configured to switch back to a previously, but partially executed run list, as in step 251, that is, when the currently executed run list is finished or when an instruction is received to do so. Thereafter, the GPU 84 can be configured to restore all previously saved states in step 253, which may have been saved in step 247 during a save state process. The CSP 190 may be configured in step 256 to skip draw commands until the saved draw command is reached according to the previously saved DMA offset, as in step 256, and also as discussed in more detail below. Thereafter, in step 258, the tile generator 226 may skip draw commands until all of the instance ID, primitive ID, and tile IDs which were saved in step 247 are received. Thereafter, in step 260, the pipeline may execute any unfinished geometries. This process is described in additional detail below.

For the beginning of a context restore process, the CSP 190 needs to process the states to the entire engine, including the current head pointer, DMA offset, instance ID, primitive ID, and tile ID, which may have been previously saved in step 247. Thus, the CSP 190 will retrieve the ring buffer head pointer from the ring buffer that was saved through the save process, as described above, and process the DMA command that is pointed to by the head pointer, and then skip all commands until the DMA address is equal to the DMA offset. This enables the CSP 190 to restart execution of the command exactly where it was interrupted, which may have been in the middle of a triangle that was being executed, as a nonlimiting example.

The CSP 190 may skip instances in the restored state process described above until the instance ID is matched, and may also skip primitives until the primitive ID is matched. The instance ID and primitive ID may be stored in state FIFO register 194 so that the CSP 190 may make the comparisons of the instances restored to the instance ID. Additional processing blocks that may be part of the GPU 84 computational core (not shown) may be configured to skip triangles until the primitive ID for a particular triangle is matched. For example, triangle IDs may be stored in a separate execution block register, also not shown herein. The tile generator 226 in the restore state process may be configured to skip tiles until the tiles match the tile ID saved at stage 247 during a save state process. Once the IDs are matched as described above, the CSP 190 may switch the 3D pipeline from a skip state to a normal state for execution.

The CSP 190 may create one or more tokens that are communicated to the 3D pipeline components 176 bearing the address of the registers for operation with an offset representing the point of processing during the previous interrupt, as well as identification of the registers to be restored. To provide flexible changes in the state context save structure, CSP 190 may operate in a configuration that includes densely packing all block state data in memory 86. As a result, the CSP 190 may implement a flexible pack register offset. The register offset communicates to each 3D pipeline block 176 the point to resume or restore operation upon an interrupted context. By adding the offset to the register address of the interrupted context, the precise point of the interrupted context may be quickly determined. Accordingly, for each 3D pipeline architectural block 176 in FIG. 10, a block ID may be associated thereto and a corresponding offset for resuming calculations. In this way, GPU 84 is able to implement an interrupt with state context save and restore which may be done completely transparent to the application so that the 3D pipeline 176 may be utilized for one or more applications in a time sharing function and operation.

For the context save process 240 described in FIG. 11, it may be desirable to provide for flexible changes in the state context save structure. Thus, one nonlimiting exemplary process includes densely packing all block state data in the memory 86. During a GPU subversion design process, each block in pipeline 176 may change register specification frequently. As a nonlimiting example, if there are in excess of 20 processing blocks (i.e., 176a, 176b, . . . 176n, where n>20), it make take a substantial amount of time to change the register data packing hardware.

Therefore, implementing a flexible packed register offset can address this issue. The table below provides for a set of registers that configures the state data save in a context save structure. For each block of state data, individual offset values are provided, which may be a combination of an offset register content and a register ID. The CSP 190 may be configured to issue a set register command targeted to a specific block in the pipeline 176. In at least one nonlimiting example, the offsets are 128-bit aligned. A nonlimiting exemplary table of register set may be configured as follows:

| | | |
|---|---|---|
| Offset Register 0 | Blockid1 | Blockid0 |
| Offset Register 1 | Blockid3 | Blockid2 |
| Offset Register 2 | Blockid5 | Blockid4 |
| Offset Register 3 | Blockid7 | Blockid6 |
| Offset Register 4 | Blockid9 | Blcokid8 |
| Offset Register 5 | Blockid11 | Blockid10 |
| Offset Register 6 | Blockid13 | Blockid12 |
| Offset Register 7 | Blockid15 | Blockid14 |
| Offset Register 8 | Blockid17 | Blockid16 |
| Offset Register 9 | Blockid19 | Blockid18 |
| Offset Register 10 | Blockid21 | Blockid20 |

A table of length registers, such as depicted below, may be configured to describe the length of state data for each block and define the upper limit of data in opcode double word for each block. The length registers may be used by the CSP 190 for an internal test. Unlike the offset register described above, the length register may be formatted for the length of 32 bits. The following table is a nonlimiting exemplary length register table:

| | | | | |
|---|---|---|---|---|
| Length Register 0 | Blockid3 | Blockid2 | Blockid1 | Blockid0 |
| Length Register 1 | Blockid7 | Blockid6 | Blockid5 | Blockid4 |
| Length Register 2 | Blockid11 | Blockid10 | Blickid9 | Blockid8 |
| Length Register 3 | Blockid15 | Blockid14 | Blockid13 | Blockid12 |
| Length Register 4 | Blockid19 | Blockid18 | Blockid17 | Blcokid16 |
| Length Register 5 | | | null | Blockid20 |

With this information, the CSP 190 can determine the length and offset of each block registers' memory location of address (block_id) for register(n), which is the base address summed with the offset register (block_id(n))<<4 (12 bits aligned). In this manner, the state context save structure is flexible. This feature provides flexibility in GPU derivative versions design.

FIG. 12 is a diagram of multiple run lists that the CSP 190 of FIG. 7 may execute containing a plurality of contexts, each context having its own ring buffer such as ring buffer 125, 150, or 162. As shown in FIG. 12, CSP 190 may alternate execution of two run lists, including run list odd and run list even, as nonlimiting examples. Each run list contains, in this nonlimiting example, four separate contexts including context 0, context 1, context 2, and context 3. The context 0-context 3 in each run list points to a separate ring buffer that may be executed by CSP 190, as described above.

In the nonlimiting example of FIG. 12, ring buffer 1 may be referenced in context 1 of run list even. In this nonlimiting example, ring buffer 1 contains various GPU commands and/or DMA commands with DMA buffer pointers, such as described above in regard to ring buffers 125, 150, and 162. In conjunction with FIG. 12, FIG. 13 is a flowchart diagram 275 of the CSP 190 processing of a current run list and ring buffer, as shown in FIG. 12.

Figure 13:
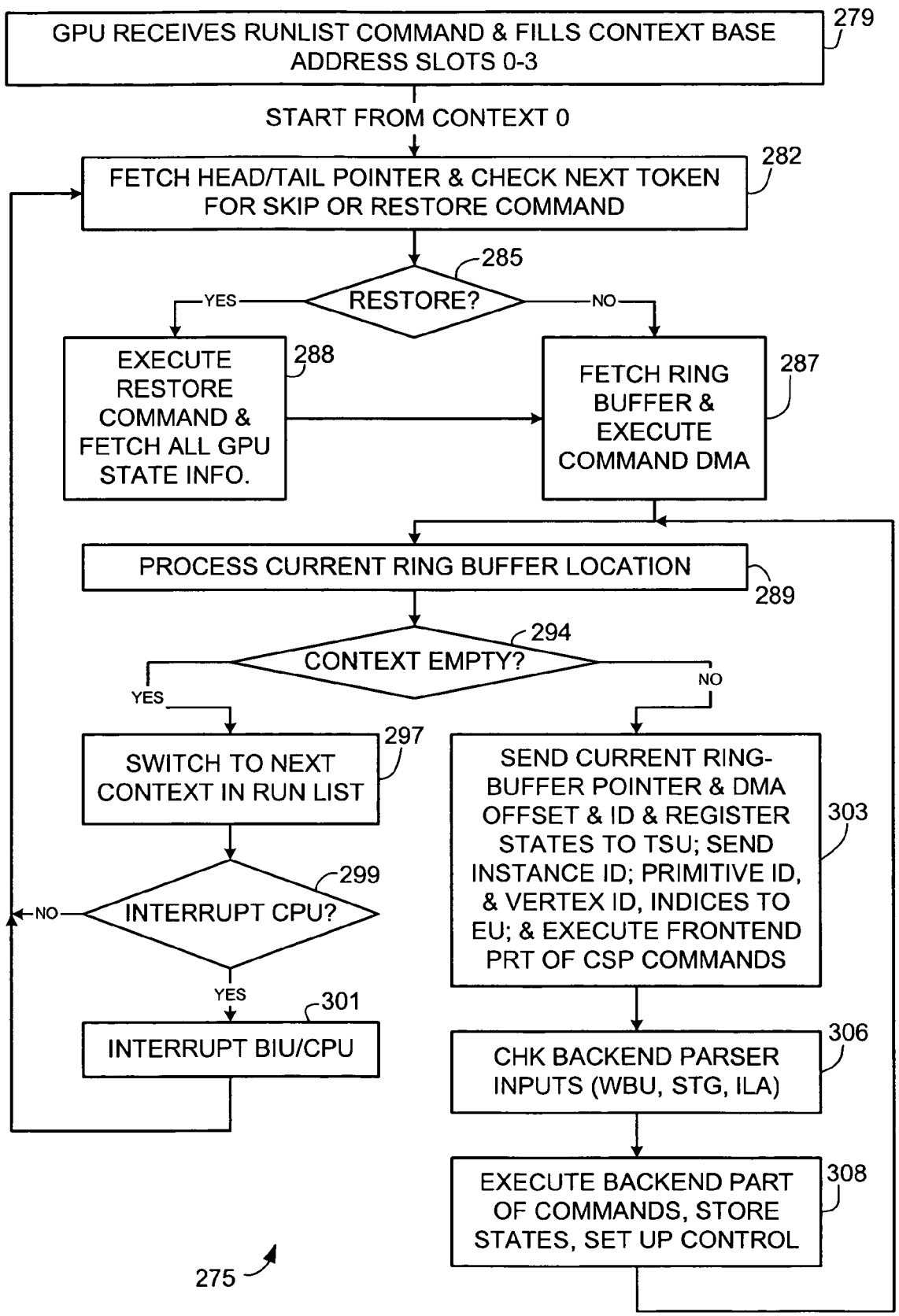
FIG. 13 is a flowchart diagram of the CSP processing of a current run list and ring buffer, as shown in FIG. 12.

GPU 84 may receive the run list command and thereafter fill the context base address slot 0-3, as shown in FIG. 12, and as also referenced as step 279 of FIG. 13 so as to establish a run list for execution. As also shown in FIG. 12, CSP 190 thereafter starts at context 0 of the run list to be executed, whether run list even or run list odd.

In FIG. 13, the CSP 190 may fetch the head and tail pointers and check a next token for a skip or restore command, as shown in step 282 and also described above. If the CSP 190 determines that the next token is a restore command, as referenced by decision block 285 and as described above (restore command 152 in FIG. 5), the CSP 190 executes the restore command and fetches all of the GPU state info, as also described above and as shown in block 288. If decision block 285 does not result in detection of a restore command in the next token, the CSP 190 may fetch the ring buffer 1 of FIG. 12 and execute a DMA command (such as DMA command 131 of FIG. 4) and its associated DMA buffer (such as DMA buffer 147 of FIG. 4).

In FIG. 12, CSP 190 and 3D pipeline 176 may access DMA pointer 290, which causes the DMA buffer 292 to be accessed. In this nonlimiting example, DMA buffer 292 contains draw command 0 and draw command 1, which is fetched when the head pointer reaches DMA pointer 290. As the head pointer moves logically from left to right down ring buffer 1, it will reach either a skip or restore command prior to DMA pointer 290 as described above. Yet, in this nonlimiting example of FIG. 12, the absence of a restore command causes the CSP 190 to start the DMA buffer fetch, which results in accessing a DMA buffer 292 and the processing of graphics related data contained in and/or referenced by the buffer.

Returning to FIG. 13, CSP 190 and 3D pipeline 176 begins to process the current ring buffer location in step 289 after the appropriate ring buffer has been fetched. In the nonlimiting example of FIG. 12, the CSP 190 may begin processing context 0 containing run buffer 0 for the run list even group. If the context is empty, as determined in step 294, a switch is made to the next context in the run list in step 297. In this nonlimiting example, the CSP 190 would switch from context 0 to context 1 such that the ring buffer 1 would be loaded and executed. In switching to ring buffer 1, the determination would be made whether there is an interrupt from the processing unit ("CPU") 16, as determined in step 299 of FIG. 13. If not, then the CSP 90 would return to step 282 for execution of the ring buffer 1 of FIG. 12. However, if an interrupt were detected in step 299, the next step would result in processing of the interrupt as shown in step 301, which subsequently would cause the process to return to step 282. The context save process of FIG. 11 would follow, as well.

If, in step 294, the context is determined not to be empty, the front-end parser 164 of CSP 190 may thereafter send the current ring buffer pointer and DMA offset and ID, as well as register states, to the triangle setup unit 214 of FIG. 10. The front-end parser 164 may also communicate the instance ID, primitive ID, and vertex ID as well as indices to the appropriate locations for execution. Additionally, the front-end parser 164 may execute any initial CSP commands as needed.

In continuing to execute the ring buffer 1 of FIG. 12, the process may flow to step 306 wherein additional logical blocks of the 3D pipeline 176 are communicated to back-end parser 178, thus signifying the approaching end of the execution of the ring buffer. Finally, in step 308, the CSP 190 executes the back-end portion of any command that stores all states resulting from the processed operation.

Figure 14:
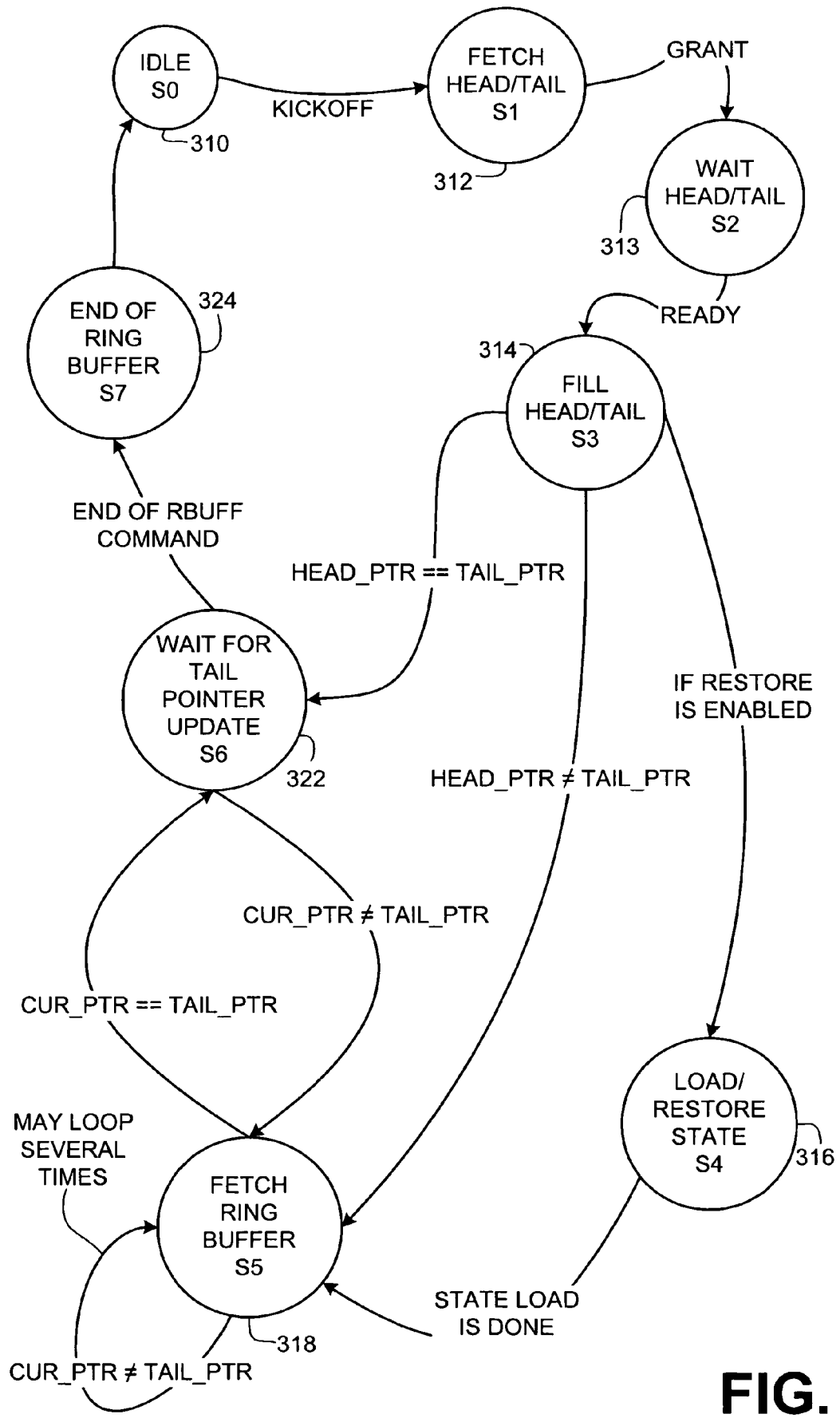
FIG. 14 is a flowchart diagram depicting the operation of the CSP of FIG. 7 as it executes a ring buffer structure and searches for a ring buffer end command in a loop that may repeat several times.

The process of FIG. 13 of fetching the head and tail pointer of a ring buffer and processing continues until the end of the ring buffer is found, or until interrupted. FIG. 14 is a flowchart diagram depicting the operation of the CSP 190 of FIG. 7 as it executes a ring buffer structure and searches for a ring buffer end command. In step 310 of FIG. 14, the CSP 190 may be idle awaiting for receipt of a ring buffer for execution. In step 312, which may correspond to step 282 of FIG. 13, the CSP 190 fetches the head and tail pointer of a ring buffer (such as ring buffer of context 1 of run list 264 even in FIG. 12) and awaits in step 314 for the head and tail pointer to be referenced and ultimately filled in step 314. In decision step 285 of FIG. 13, if a restore context command is encountered, the operation, as referenced in FIG. 14, moves to step 316 for loading the restored state, which also corresponds to block 288 of FIG. 13. Once the load state is done, the operation moves to step 318 such that the ring buffer is fetched and operation may continue, as corresponding to step 289 of FIG. 13.

If a restore command is not activated or recognized at step 314, a determination is made whether the head pointer is equal to tail pointer, meaning whether the context is empty, thereby corresponding to step 294 of FIG. 13. If the head pointer does not equal the tail pointer, then the ring buffer contains operations for processing, thereby causing the process to move from step 314 to step 318, as described above. At step 318, the current pointer is moved from its initial position toward the tail pointer and with each calculation a determination is made whether the current pointer, which may be the head pointer, equals the tail pointer. As processing continues, the head pointer, or current pointer, moves toward the tail pointer to where it ultimately equals the tail pointer. Step 318 may repeat in a loop several times until the current pointer (CUR_PTR) becomes equal to the tail pointer (TAIL_PTR).

When the current pointer, or head pointer, reaches the tail pointer, step 322 is reached, which causes the CSP 190 to wait for a tail pointer update. As shown in FIG. 12, the tail pointer may be moved if additional commands or pointers are added to the ring buffer during processing. However, if the tail pointer is not moved, the process moves to step 324 which connotes the end of the ring buffer, as shown in FIG. 12. The CSP 190 returns to an idle state 310 and prepares to repeat the process described above.

FIG. 15 is an additional diagram of the data structures as described above in reference to FIGS. 12-14 that may be utilized for the GPU 84 of FIG. 1 to precisely restore a previously interrupted context, as described herein. In this nonlimiting example, run list 264 (also shown in FIG. 12) may have been executed as described above such that a context switch is made from context 0 to context 1.

Ring buffer 1 data structure 265 in memory may be accessed for restoration of this particular context 1, that is, in this nonlimiting example. As similarly described above, the ring buffer 1 data structure 265 may contain a tile head pointer slot 268 that may be updated by the GPU 84 during processing of this context. Likewise, ring buffer 1 data structure 265 may contain a ring buffer tail slot 268 that may also be updated, as described in regard to FIG. 12. If commands or pointers are added to the ring buffer 1 data structure in FIG. 15, then the ring buffer tail slot may be adjusted accordingly.

The ring buffer data fetch sequence may entail that a CSP function leads to the execution of DMA command pointer 290, as also referenced in FIG. 12. The CSP 190 fetches the tile head pointer, as shown in FIG. 15 in association to the ring buffer 1 data structure, which was in the ring buffer 1 data structure when this context 1 in run list 264 was previously interrupted. The CSP 190 may load all of the data corresponding to DMA command pointer 290 to the CSP head pointer, which points to the CSP function 291, into the pipeline 176.

The DMA command pointer 290 references the DMA buffer structure 292 in memory that may, at least on one nonlimiting example, contain draw command 0 through draw command 5. In restoring this context, the CSP 190 also processes a DMA offset 293, as similarly described above (FIG. 5), which enables matching of the processing of the context to the precise point where previously interrupted. The DMA offset 293 is the logical distance between the DMA buffer head pointer and the current command pointer for the DMA buffer structure 292.

In this nonlimiting example of FIG. 15, the CSP 190 is configured to recognize that the DMA offset 293 establishes draw command 4 as the point to resume processing. Draw command 4 may be comprised of multiple instances 295 of the draw command 4. More specifically, draw command 4 may include instances 0-5 that are executed sequentially. After instance 5 is processed, in this nonlimiting example, processing may then turn to draw command 5 in the DMA buffer structure 292, which, as with any draw command, may itself have multiple instances.

In reestablishing this context from run list 264, the CSP 190 discards all instances previously executed until matching the instance ID corresponding to the value stored at the previous interrupt. In this nonlimiting example, the instance ID 304 points to instance 4 of the multiple instances 295. Thus, the CSP 190 discards all instances 0-3 until reaching instance 4, for it is this logical position where the instance ID 304 matches.

Each instance of the multiple instances 295 contains one or more primitives, which may be sequenced, as shown in primitive structure 296. In this nonlimiting example, primitives 0-M may form an instance, which M is an integer. The interrupted draw command 4 in the DMA buffer structure 292 is processed by the CSP 190 until the primitive ID 311 matches the value corresponding to the point of prior interrupt, which was saved, as described above. In this nonlimiting example, the primitive ID 311 points to primitive 1, which means that the CSP 190 would skip primitive 0, as primitive 0 was processed prior to the previous interrupt.

Each primitive 0-M references one or more tiles, which may be processed for drawing triangle 298. In this nonlimiting example, primitive 2 may contain tiles 0-8 to construct triangle 298. Also in this nonlimiting example, the tile generator TG 226 will skip tiles 0-3 until reaching the tile ID 317 that references tile 4, thereby corresponding to the tile ID value stored in memory for the point where previously interrupted.

In this manner, the data structure depicted in FIG. 15 illustrates at least one method for restoring a graphics operation at the precise point where the operation may have been previously interrupted. By the CSP 190 skipping the draw commands, instances, primitives, and TG 226 skipping tiles until reaching the IDs corresponding to the values saved when the context was previously interrupted, processing can resume quickly at the correct point, thereby avoiding duplicative processing of previously processed data.

Figure 16:
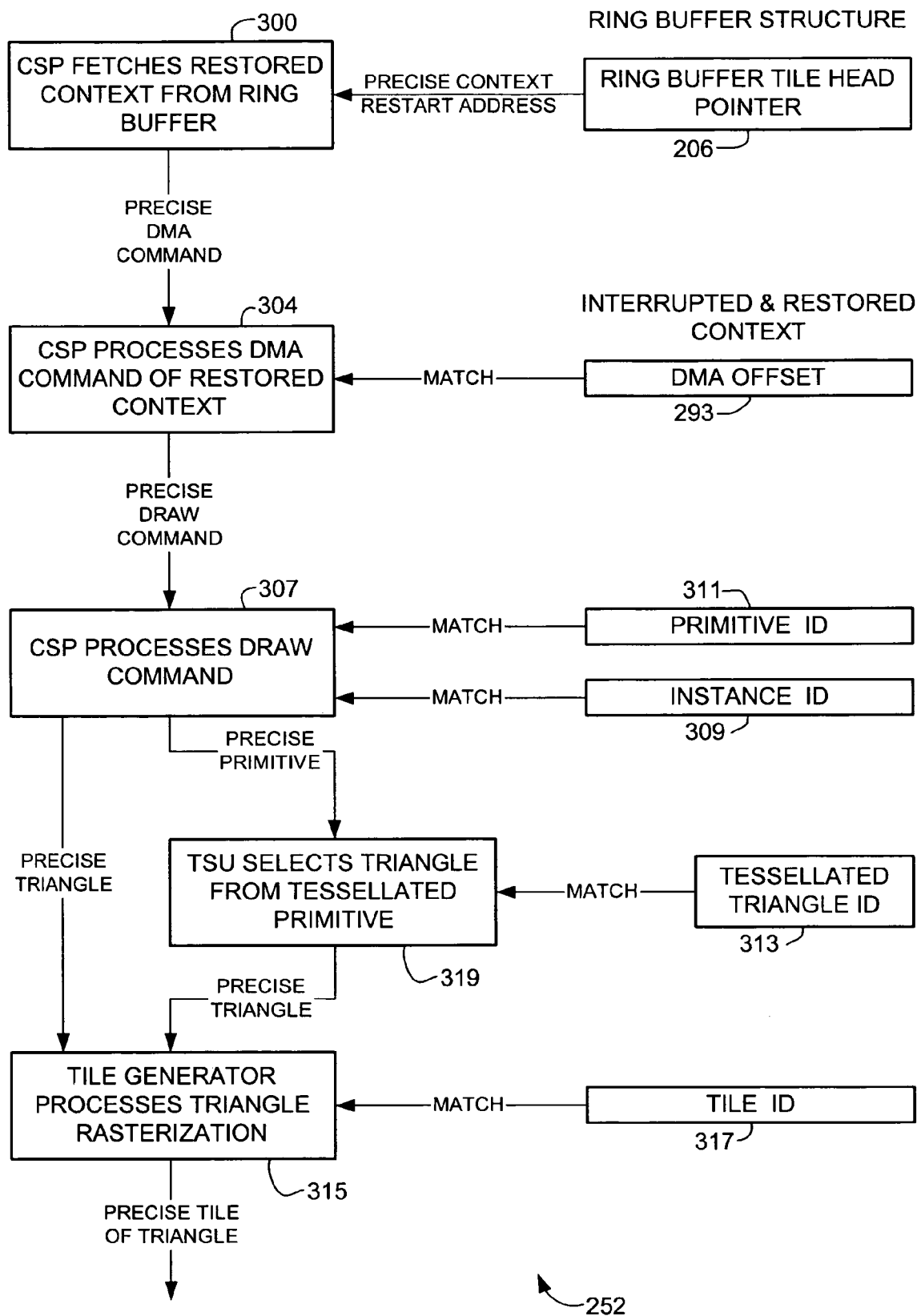
FIG. 16 is a diagram of the precise location process of a restored process that is implemented in a portion of the steps of FIG. 11 by the CSP of FIG. 10.

FIG. 16 is a flowchart diagram 252 of the process that the CSP 190 implements, in this nonlimiting example, when restoring a context. The diagram 252 of FIG. 16 includes steps 253, 256, and 258 of FIG. 11, but is also focused on the operation of precise context restoration.

In FIG. 16, in step 300 the CSP 190 fetches the restored context from the ring buffer, which may be ring buffer 265 of FIGS. 12 and 15. In so doing, the ring buffer 265 tile head pointer 206 is accessed so as to ascertain the precise context restart address or logical location in ring buffer 265. In the nonlimiting example of FIG. 15, the tile head pointer points to DMA command pointer 290.

Continuing to step 304, the CSP 190 processes the DMA command, as similarly described above, and operates to match the DMA offset 293 (also in FIG. 15) to the correct draw command in the DMA buffer structure 292 (FIG. 15). Upon identifying the precise draw command, which in the nonlimiting example of FIG. 15 is draw command 4, the CSP 190 moves to step 307 and matches the instance ID 309 and the primitive ID 311, as discussed above. In making these matches, the CSP 190 identifies the precise triangle where processing was previously interrupted.

At that point, the CSP 190 may identify the precise tile ID 317 where prior processing was interrupted so that the tile generator 226 (FIG. 10) may finish processing the triangle, as shown in step 315. After this precise DMA command, draw command, instance ID, primitive ID, and tile ID are identified, the context can be fully restored in the 3D pipeline 176 as if it had not previously been interrupted, that is, in at least one nonlimiting example.

In instances where a triangle may have been partially processed when previously interrupted due to a context change, a triangle ID may be forwarded to the TSU 214. Individual triangles within a draw primitive (having a single primitive ID) may have unique triangle IDs, some of which may have been processed in whole or in part at the time the context was previously interrupted. In this instance, a tessellated triangle ID 313, which may be generated by an execution unit, may be forwarded to the TSU 214 for resuming processing operations on this partially processed primitive, as shown in step 319 of FIG. 16. The result is that a precise triangle is forwarded to the tile generator 226 that may be matched to a corresponding tile ID, as discussed above. So regardless of whether a primitive has been previously tessellated or not, the resumption of processing of a previously interrupted context can be seamless and precise.

Thus far, the focus of this disclosure has been on the structure and the switching of contexts upon receipt of an interrupt command from the processing unit 16 of FIG. 1, including the data structure that provides for precise restoration. However, when a context is interrupted for future restoration, the GPU 84, and more particularly, the 3D pipeline 176 of FIG. 10, should be configured so as to terminate the interrupted process at a logical point so that a next process, whether restored or not, may be executed by the 3D pipeline 176 in accordance with the process described above.

At least one nonlimiting example prescribes that a context may be saved and a new context restarted in approximately one to two million cycles, which should generally be sufficient to provide enough wrap-up time for some processing so as to minimize the state that may be tracked and to minimize the complexity when a save state is restarted subsequently in time. Consequently, as described above, one logical location to break the 3D pipeline 176 of FIG. 10 is at tile generator 226. However, as an alternate nonlimiting example, another location of breakpoint could be ZL1 unit 230 instead of tile generator 226. In this nonlimiting example, the same rules and IDs could apply, and the saved Tile ID would go to the ZL1 unit 230 to be compared.

However, according to the nonlimiting example where the break is at the tile generator 226, any tiles that are already admitted by the tile generator 226 to the remaining portions of the pipeline, including ZL1 unit 230 and the subsequent units, up until the time of a context switch is signaled by the processing unit 16, will be allowed to drain through the 3D pipeline 176. However, any triangles or tiles that have not reached the tile generator 226 when an interrupt is received by the GPU 84 may be, in this nonlimiting example, discarded and regenerated when the context is subsequently restored. Stated another way, for the portion of the 3D pipeline 176 above the tile generator 226, all processing results are discarded and are subsequently regenerated when the context is restored (see FIG. 8).

At least one reason for interrupting at the tile level (at tile generator 226) is that, except in the case of extremely long pixel shader programs, the 3D pipeline 176 may be configured to process all tiles in the pipeline below the tile generator 226 within the target one to two million cycles. As a nonlimiting example, if an interrupt is configured at the triangle setup unit 214 of FIG. 10, it is possible that the pipeline may not be able to drain in the 1 to 3 milliseconds desired in this nonlimiting example. Interrupting on a scale smaller than tiles may not have much impact on how fast the pipeline can be drained. By configuring interrupts at the tile generator level of the pipeline, a certain amount of processing may continue, a certain amount of processing may be aborted, and the point of interrupt may be saved for subsequent restart. This nonlimiting example results in that some data will be reparsed and repeated in order to restore the 3D pipeline 176 to the point in which it was stopped at the interrupt.

According to at least one nonlimiting example, in order for the CSP 190 to know where in the command parsing that it will need to restart a context, the CSP 190 may be configured to communicate a token (internal fence) through the 3D pipeline 176 to the tile generator 226 and then back to the CSP 190 whenever the DMA buffer (context) is switched. According to this nonlimiting example, the CSP 190 may then know when it is safe to discard a DMA buffer. Also, this nonlimiting example provides that the position in the DMA buffer corresponding to the processing position in the tile generator 226 is recorded in this way with each new draw command, such as shown in FIG. 12 in DMA buffer 292. Thus, when a context, such as context 1 in run list even in FIG. 12, is subsequently restored, parsing can start from the draw command that was interrupted, such as a draw command 0 in buffer 292.

Figure 17:
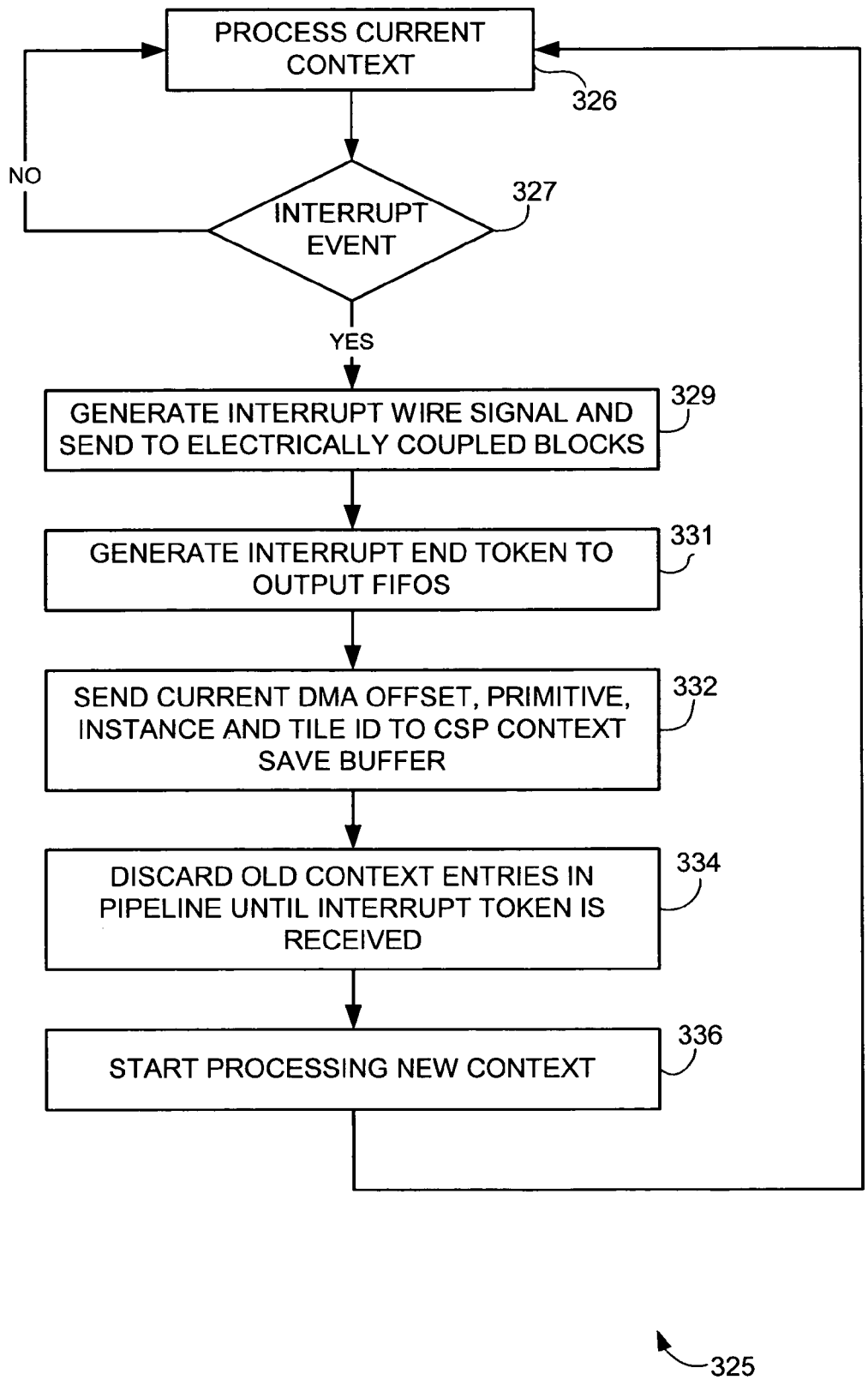
FIG. 17 is a flowchart diagram of a process for interrupting a first context in the pipeline of FIG. 10 and for initiating processing of a next context.

FIG. 17 is a diagram of the process 325 that CSP 190 of FIG. 10 may implement to interrupt a context and restart another context in the 3D pipeline 176 of FIG. 10. In step 326, which also corresponds to step 101 of FIG. 2, a current context may be processed, as described above, until empty, such as in step 294 of FIG. 13. As the context is processed in step 326, a determination may be made as to whether an interrupt event has transpired, as in step 327. If not, the context may be further processed in step 326 until empty.

If, however, an interrupt event is recognized in step 327, the CSP 190 may move to step 329 and generate an interrupt signal that may be electrically communicated to one or more of the processing blocks of the 3D pipeline 176. As stated above, a certain portion of the pipeline may be immediately discarded, as the continued processing of the upper portions of the pipeline may result in unsatisfactory context switch times due to the delay in clearing the top portion blocks. Yet, step 329 provides that a predetermined number of blocks of 3D pipeline 176 receive the interrupt signal as a result of a dedicated communication path with the CSP 190.

In addition to generating the interrupt signal in step 329, the CSP 190 may also generate an interrupt token to memory FIFOs in the 3D pipeline 176. This interrupt token operates as a fence between the interrupted context and a next or restored context, such as in run list 264 of FIG. 15. The interrupt token/fence communicates to each architectural block in the 3D pipeline 176 that the changeover to a next or restored context is complete.

As discussed above, the current DMA offset 293, instance ID 309, primitive ID 311, and tile ID 317 may be sent to the CSP context save buffer 111 (FIG. 3), which may be state FIFO 194 of FIG. 7. More specifically, the 3D architectural blocks 176 use paths 207, 209, etc. to forward this information to the CSP 190, as similarly described above.

Thereafter, in step 334, each 3D pipeline architectural block 176, such as one or more blocks shown in FIG. 10, discard old context entries in the pipeline 176 until the interrupt token generated in step 331 is reached and identified. The old context is the interrupted context. Stated another way, upon receipt of the interrupt signal on the dedicated communication path in step 329, the architectural blocks 334 discard associated FIFOs until receiving the interrupt token, which signifies that all commands thereafter belong to the next or restored state, which are processed in step 336.

This process depicted in FIG. 17 is described in greater detail below in regard to FIGS. 10 and 18-23 in regard to the individual components of the 3D pipeline 176. Beginning with FIG. 10, when the GPU 84 receives the command from the processing unit 16 to interrupt a process being processed, the CSP 190 communicates the hardwired signal to the execution unit pool front module 212, which is shown in FIG. 10 as EUP_FRONT 212, via hardware interrupt line 331. This same hardware interrupt line 331 is also electrically coupled to tile generator 226, as shown in FIG. 10. Additionally, hardware interrupt 331 may also be coupled to triangle setup unit 214 and attribute setup unit 218 all in accordance with step 329 of FIG. 17.

The tile generator 226 may maintain a counter for the tile number and pipeline registers for triangle number and primitive number of the last tile emitted. This information is sent back to the CSP 190 via data path 207 to be saved as part of the interrupted context state. This information references the position in the command stream where the GPU 84 should start processing again when the saved context is later restored.

The hardwire interrupt signal communicated on line 331 is also communicated to each of triangle setup units 214 and attribute setup unit 218. Upon receipt of the hardwire interrupt signal on line 331, each of the triangle setup unit 214, attribute setup unit 218, and tile generator 226 immediately discard all data being processed and cease further operations on that particular context, as also described in step 334 of FIG. 17. The CSP 190, in addition to issuing the wire signal interrupt on line 331, passes an interrupt end token, which may be represented as "INT_End token" in this nonlimiting example, down the 3-D pipeline 176 so as to flush all dirty lines in the processing stream, as described in step 331 of FIG. 17. This interrupt end token is communicated from the CSP 190 to the triangle setup unit 214, to the attribute setup unit 218, and through the rest of the pipeline 176.

Figure 18:
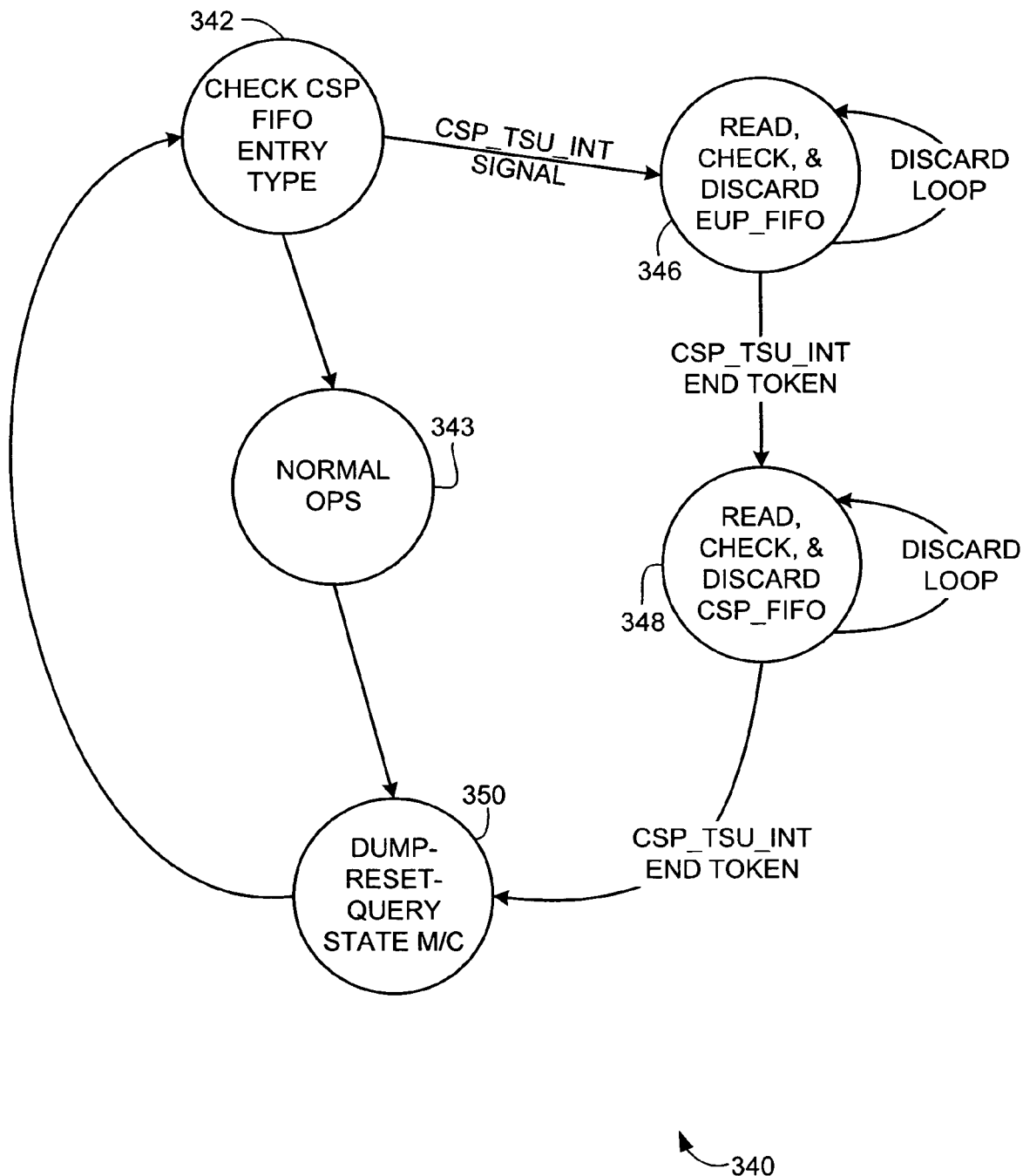
FIG. 18 is a flowchart diagram of the triangle setup unit of FIG. 10 as it operates upon receipt of a wire interrupt signal and the interrupt end token.

FIG. 18 is a flowchart diagram 340 of the triangle setup unit input decoder 214 as it operates upon receipt of an interrupt end token, as described above. CSP 190 issues the interrupt end token to the execution unit pool front 212 via path 331. However, at the same time, CSP 190 communicates the interrupt end token through CSP FIFO memory 211 that is ultimately communicated to triangle setup unit 214. Thus, in FIG. 18, the triangle setup unit 214 engages in step 342 initially upon receiving the wire interrupt signal on line 331 so as to check the CSP FIFO memory 211 for its entry type.

Upon receiving the interrupt signal on line 331, which may be shown in FIG. 18 as the CSP_TSU_INT signal, the triangle setup unit 214 moves to step 346, which prescribes that the triangle setup unit 214 reads, checks, and discards the EUP FIFO memory 347. The EUP FIFO memory 347 is a FIFO storing data passed from the EUP_Front module 212 to the triangle setup unit 214. The triangle setup unit 212 invokes a discard loop, as shown in FIG. 18, to discard the contents of the EUP FIFO memory 347 until reaching the interrupt end token, which represents the discarding of all data for the context being saved.

Upon reaching the interrupt end token at EUP FIFO memory 347, the triangle setup unit 214 returns to the CSP FIFO memory 211 to read, check, and discard its contents in similar fashion as performed on EUP FIFO memory 347, as shown in step 348 of FIG. 18. Triangle setup unit 214 engages in a discard loop to discard all contents in the CSP FIFO memory 211 until reaching the interrupt end token representing the end of the context being saved. Consequently, one of ordinary skill in the art would realize that data associated with the context being interrupted is discarded at this stage of the 3D pipeline 176. The triangle setup unit ultimately moves from step 348 to step 350 in FIG. 18, which prescribes the dumping and/or resetting of the query state machine in preparation of the next context to be executed. After checking the next FIFO entry type in CSP FIFO memory 211, the triangle setup unit 214 may return to normal operations in step 343 to process a new (next) context.

Figure 19:
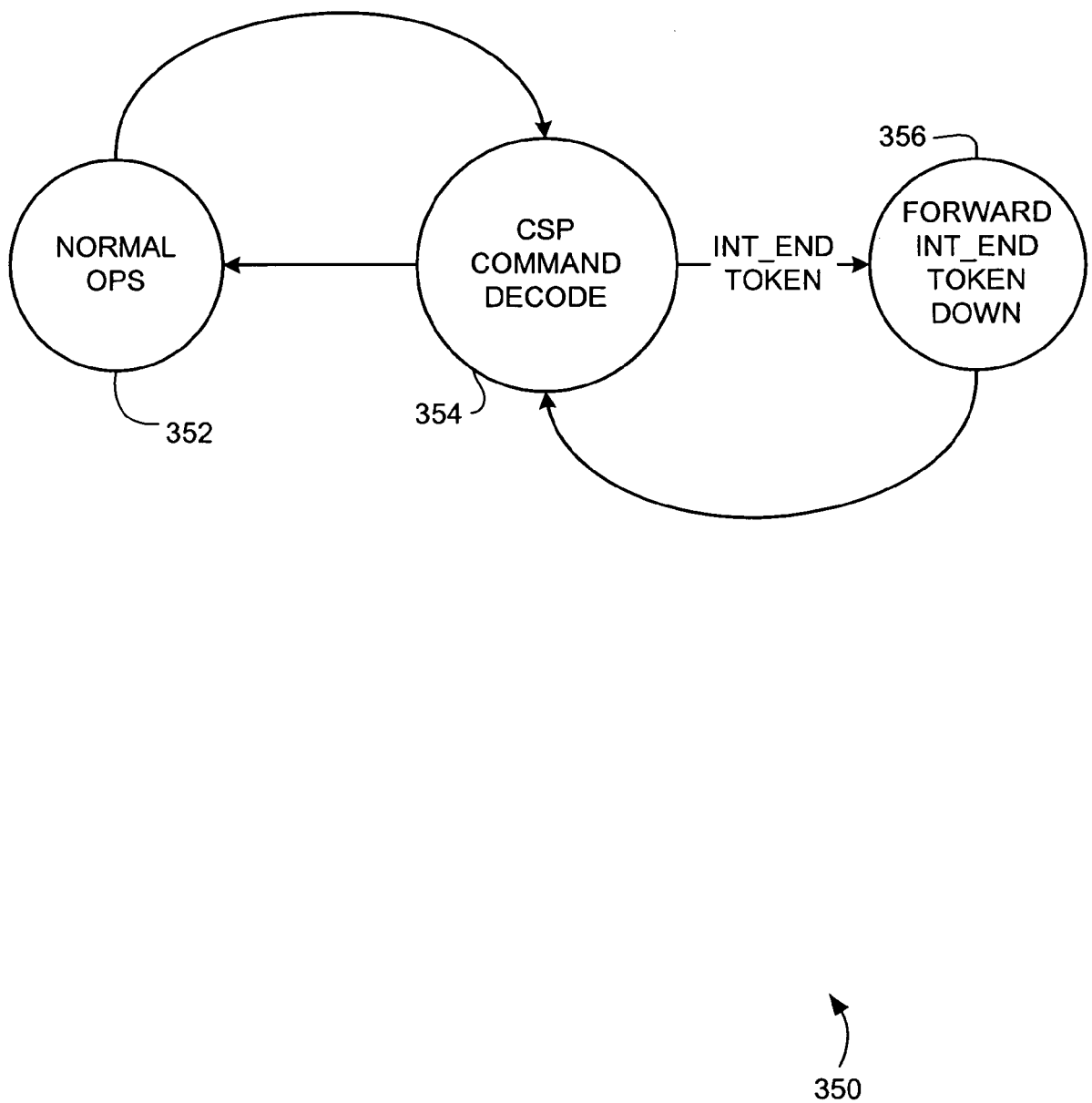
FIG. 19 is a diagram of the process executed by the dump/reset/query state machine in each architectural unit of the 3D pipeline of FIG. 10.

In regard to dump-reset-query state machine stage 350, FIG. 19 is a simplified diagram of the process executed by the dump/reset/query state machine ("DRQ state machine") in each unit of the 3D pipeline 176 of FIG. 10. While the DRQ state machine may initially be in normal operating mode 352, upon execution of a command, the DRQ state machine moves to step 354. Movement to step 354 pertains to a CSP command decode operation, which informs the DRQ state machine (i.e., TSU 214, etc.) what to do next. In the case when an interrupt end token is received by a unit, such as triangle setup unit 214, step 356 follows so as to forward the interrupt end token down the 3D pipeline 176. Thereafter, the unit such as triangle setup unit 214, returns to normal operations in step 352, regarding the new context.

After the interrupt end token is processed, as described above in regard to FIG. 18 and triangle setup unit 214, focus shifts to the attribute setup unit 218 of FIG. 10. As described above, the attribute setup unit 218 also receives the wire interrupt signal on line 331, thereby notifying the attribute setup unit 218 to immediately discard all contents related to the current context.

Figure 20:
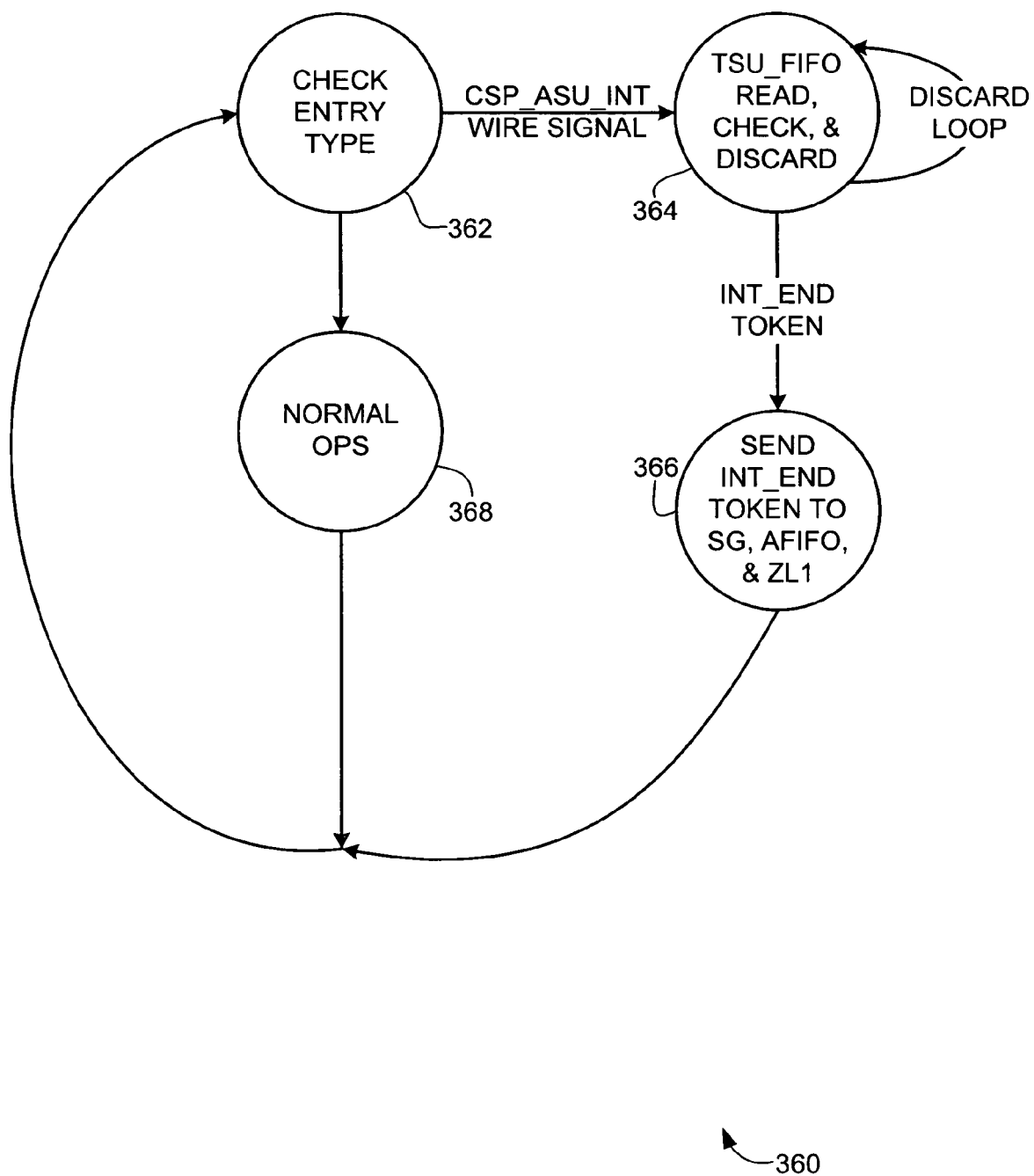
FIG. 20 is a diagram depicting a process implemented by the attribute setup unit of FIG. 10 in the event of a hardwire interrupt signal being received followed by the interrupt end token.

FIG. 20 is a diagram 360 depicting a process implemented by the attribute setup unit 218 in the event of a hardwire interrupt signal being received on line 331. In this instance, the attribute setup unit 218, upon receiving the wire interrupt signal, operates in step 364 to read, check, and discard the TSU_FIFO memory 215 of FIG. 10. More specifically, the attribute setup unit 218 engages in a discard loop to discard the contents of the TSU FIFO memory 215 until reaching the interrupt end token communicated by the triangle setup unit 214, as described above. When the DRQ state machine component of attribute setup unit 218 receives the interrupt end token, step 366 is implemented, wherein the interrupt end token is communicated to each of the ASU FIFO memory 220, ASU/ZL1 FIFO memory 219, and also AFIFO memory 223. Thereafter, the attribute setup unit 218 returns to step 362 to check the entry type of the next instruction in the TSU FIFO memory 215, which may relate to a new context to be executed, thereby leading to normal operations in step 368.

Figure 21:
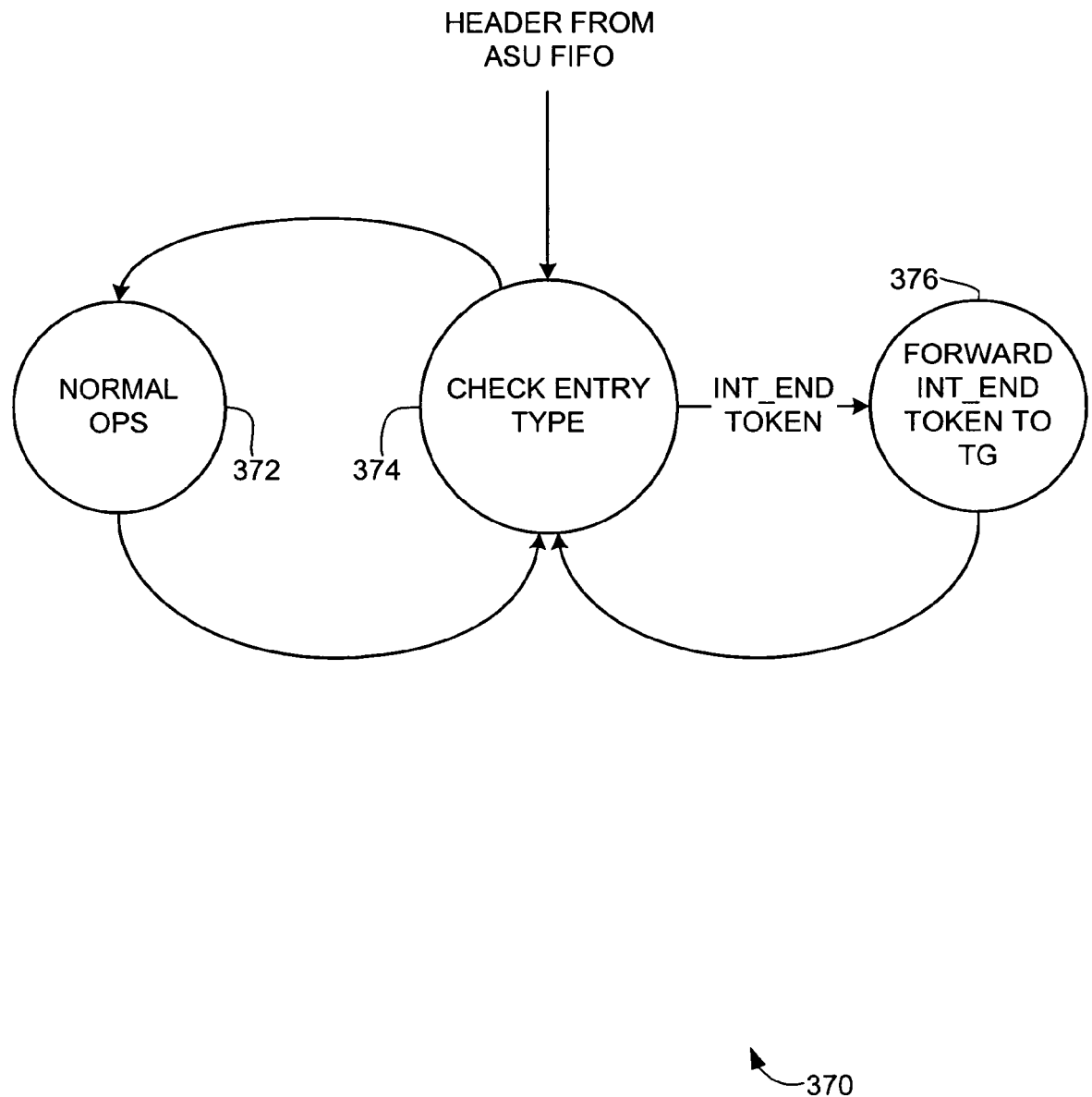
FIG. 21 is a diagram of a process implemented by the span generator of FIG. 10 in regard to the handling of the interrupt end token communicated down the pipeline of FIG. 10.

As described above, attribute setup unit 218 forwards the interrupt end token to ASU FIFO memory 220, which is ultimately communicated to span generator unit 222. FIG. 21 is a diagram of the process implemented by span generator unit 222 in regard to the handling of the interrupt end token communicated down the 3D pipeline 176 of FIG. 10. While the span generator unit 222 may operate in step 372 to execute normal operations, upon checking the entry type in step 374 and recognizing the interrupt end token as communicated from the ASU FIFO memory 220, the span generator unit 222 moves to step 376. In step 376, the interrupt end token is forwarded on to the tile generator unit 226, thereafter causing the span generator unit 222 to return to step 374 to check the next entry type. In the case of a next context command following the interrupt end token, the span generator unit 222 may return to normal operations, as in step 372.

Figure 22:
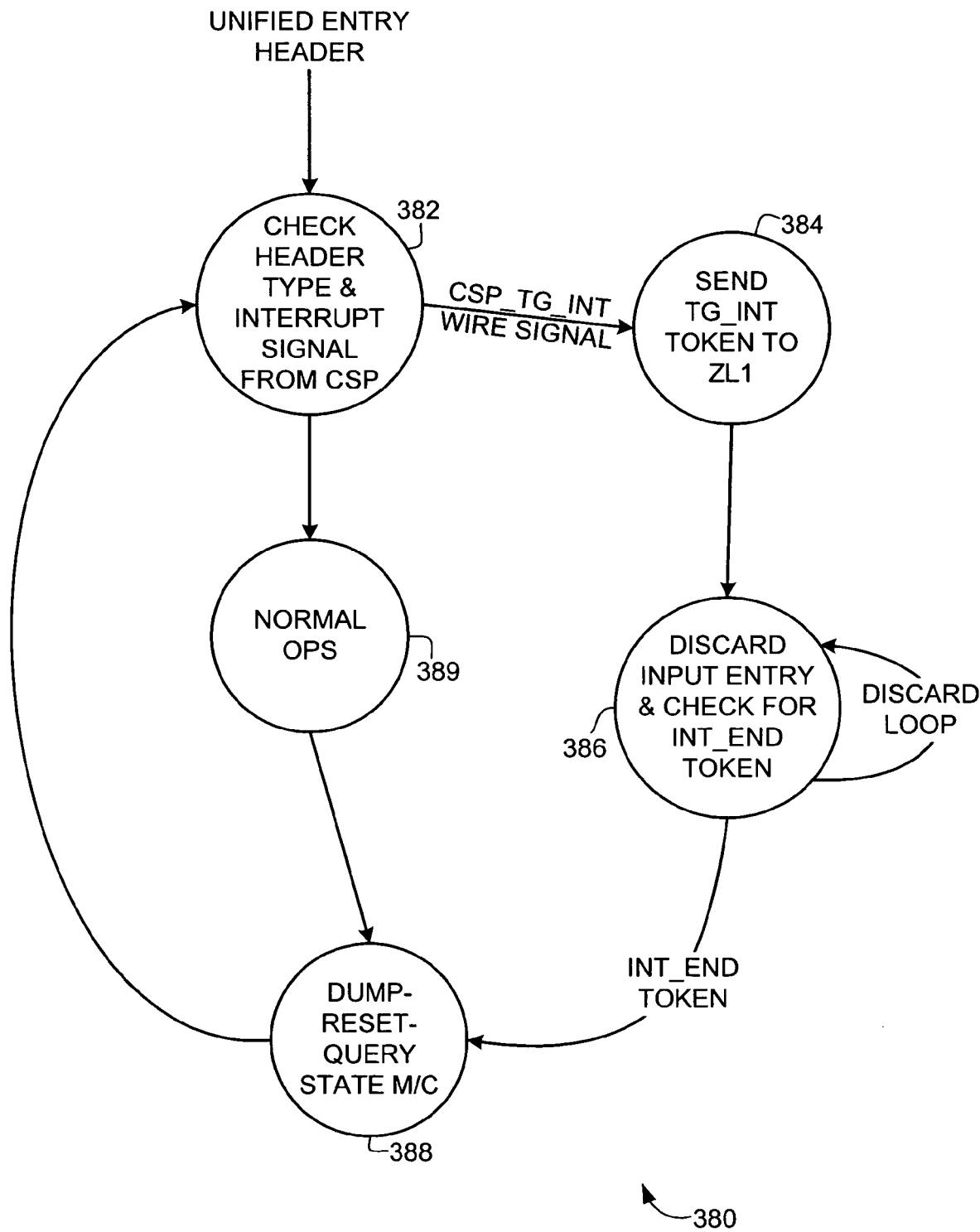
FIG. 22 is a diagram of a process flow implemented by the tile generator of FIG. 10 upon receipt of an interrupt wire signal from the CSP of FIG. 10.

As described above, the tile generator 226 is configured to receive a hardwire interrupt signal on line 331 communicated by CSP 190 after being issued by the processing unit 16 of FIG. 1. FIG. 22 is a diagram of the process flow 380 implemented by the tile generator 226 upon receipt of an interrupt command from the CSP 190 of FIG. 10. When the hardware interrupt signal is communicated to the tile generator 226 on line 331, the tile generator 226 operates in step 382 to check the header type and the command associated with the interrupt received from CSP 190.

Upon determining that an interrupt signal has been received on line 331, the tile generator 226 moves to step 384 to immediately forward a tile generator interrupt token to the Z unit level 1 module 230 ("ZL1 module") in FIG. 10. One of ordinary skill in the art would understand, additionally, that the tile generator interrupt token that is communicated to the ZL1 module 230 is communicated in advance of receipt of the interrupt end token being communicated down the pipeline 176, as described above. This tile generator interrupt token is communicated so as to flush all FIFOs and caches subsequently coupled to the tile generator 226 but to otherwise allow all data in advance of the tile generator interrupt token to be processed in association with the context being saved.

In step 386, the tile generator 226 engages in a discard loop to discard the input entry and check for the interrupt end token being communicated down the pipeline, as described above. Ultimately, upon execution of step 386, the interrupt end token will reach the tile generator 226 through the 3D pipeline 176 of FIG. 10. At that point, the tile generator 226 moves to step 388, as similarly described above. Thereafter, the tile generator 226 may check the header type of the next instruction communicated to determine its type and may return to normal operations as in step 389, which may be associated with a next context that has been restored.

Figure 23:
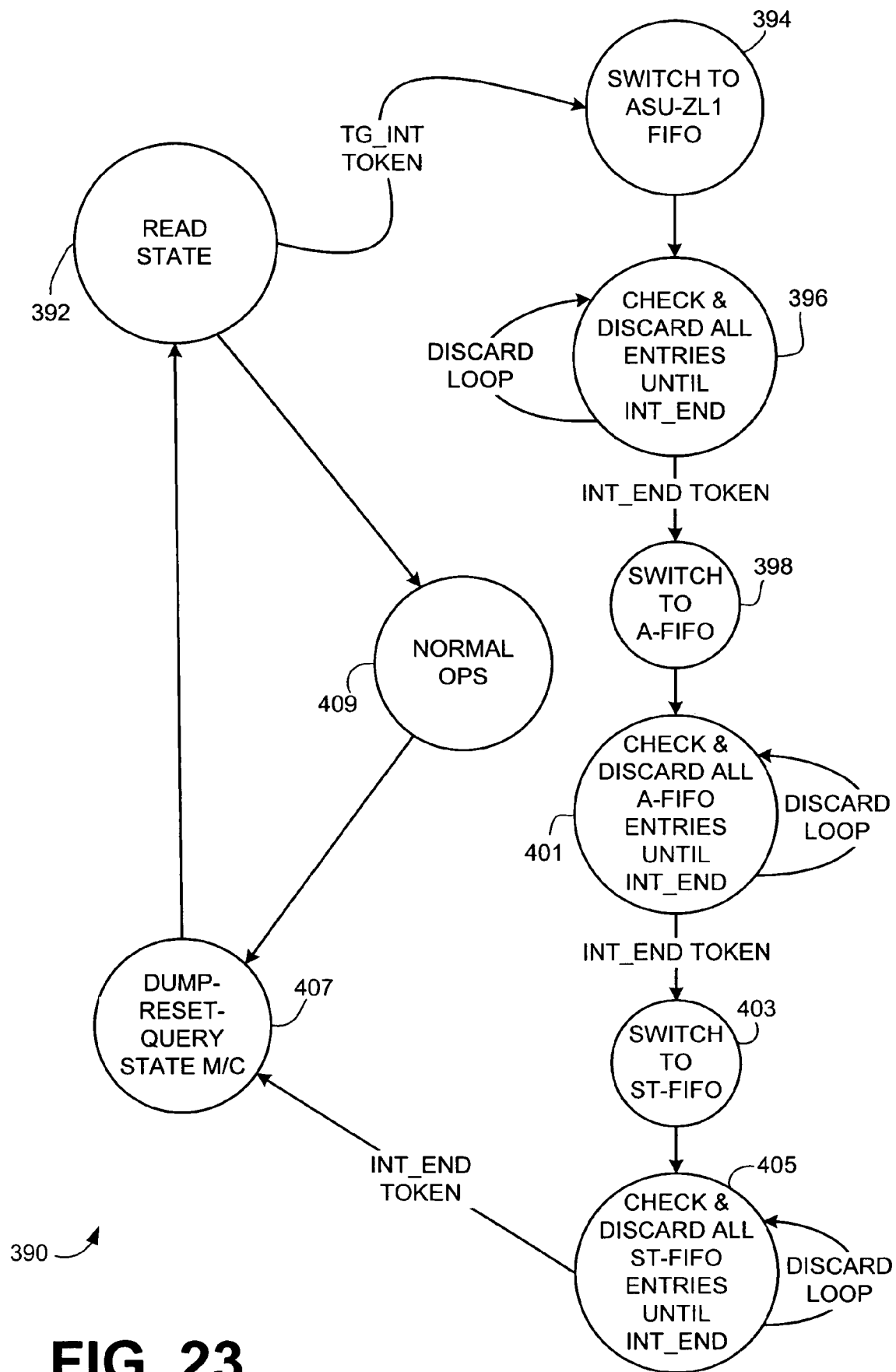
FIG. 23 is a flowchart diagram of the Z unit level 1 module of FIG. 10 as it may respond to receiving a tile generator interrupt token from the tile generator of FIG. 10.

The next module in the 3D pipeline 176 of FIG. 10 is the ZL1 module 230. FIG. 23 is a flowchart diagram 390 of the ZL1 module 230 of FIG. 10, as it may operate in regard to receiving a tile generator interrupt token from tile generator unit 226.

In a first step 392 (read & decode), the ZL1 module 230 reads the entry from TG FIFO memory 227 and processes instructions, as received. However, in the instance when an instruction is a tile generator interrupt token, as communicated by tile generator unit 226, the ZL1 module 230 moves to step 394.

In step 394, the ZL1 module 230 switches to the ASU/ZL1 FIFO memory 219 and thereafter initiates a discard loop, as shown in step 396. In step 396, the ZL1 module 230 checks and discards all entries in the ASU/ZL1 FIFO memory 219 until reaching the interrupt end token being communicated down the 3D pipeline 176. Upon receiving the interrupt end token, the ZL1 module 230 moves to the AFIFO memory 223 in step 398 and subsequently initiates discard loop 401.

In discard loop 401, the ZL1 module 230 checks and discards all entries in AFIFO memory 223 until reaching the interrupt end token contained in AFIFO memory 223. After cleaning these two FIFO memories 219 and 223, the ZL1 module 230 switches to the TG FIFO memory 227 in step 403 and initiates yet another discard loop, as shown in step 405. In step 405, the ZL1 module 230 checks and discards all entries in the TG FIFO memory 227 until reaching the interrupt end token in similar fashion, as described above. Thereafter, the DRQ state machine step 407 is implemented (as similarly described above) so that the ZL1 module 230 returns to step 392 for the next instruction after the interrupt end token. Subsequently, the ZL1 module 233 begins processing a next context in normal operation step 409.

After the interrupt end token is received by ZL1 module 230 as described above, it is forwarded to ZL1 FIFO memory 232 and then ultimately to Z unit level 2 module (hereinafter "ZL2 module") 234. Unlike as described above, ZL2 module 234 does not discard all FIFOs, but instead continues processing operations in regard to the context being saved due to the fact that continued processing can be completed within the target 1 to 2 million cycle window, that is, in at least this nonlimiting example. Nevertheless, the interrupt end token is ultimately received from the ZL1 FIFO memory 232 representing the end of the saved context and the beginning of the new and/or restored context.

The interrupt end token is further communicated throughout the remaining portions of the 3D pipeline 176, as one of ordinary skill in the art would know. As described above, the interrupt end token may be communicated to additional architectural components 176 to flush all dirty lines associated with the data preceding the interrupt end token.

Consequently, as disclosed herein, the graphics pipeline of the graphics processor may change states, or processing operations, as directed to increase the efficiency of graphics processing operations as a whole. In instances where a certain operation needs to wait on other information and data before concluding its own processing operation, the graphics pipeline may be interrupted and quickly oriented to execute another context or operation so that the pipeline is not idle. Thus, the graphics pipeline, as disclosed herein, may realize more efficient operation, as a nonlimiting example, by resolving situations that may previously resulted in a bottleneck in the graphics pipeline. Instead, this disclosure enables fast transitions between different contexts to avoid bottleneck situations.

The foregoing description has been presented for purposes of illustration and description. It is not intended to be exhaustive or to limit the disclosure to the precise forms disclosed. Obvious modifications or variations are possible in light of the above teachings. The embodiments discussed, however, were chosen, and described to illustrate the principles disclosed herein and the practical application to thereby enable one of ordinary skill in the art to utilize the disclosure in various embodiments and with various modifications as are suited to the particular use contemplated. All such modifications and variation are within the scope of the disclosure as determined by the appended claims when interpreted in accordance with the breadth to which they are fairly and legally entitled.

Therefore, based on the disclosure above, at least the following is claimed:

1. A method for saving and restoring a state context in a graphics processing unit ("GPU"), comprising the steps of:
   receiving an interrupt command or event when a first state context is being executed by the GPU;
   saving the first state context in a memory including a precise processing position for the first state context corresponding to receipt of the interrupt command;
   establishing a context save buffer containing an offset value corresponding to a logical location where processing in the first state context is interrupted upon receipt of the interrupt command in each architectural unit of a processing pipeline of the GPU;
   establishing a primitive identifier, a tile identifier, and an instance identifier in the context save buffer corresponding to a processing status at the moment of receipt of the interrupt command, the primitive identifier defining an interrupted primitive, the tile identifier defining an interrupted tile, and the instance identifier defining a point of interrupt in an interrupted draw command; and
   loading a second state context for processing in the GPU from a predetermined logical location, wherein the GPU executes one or more instructions associated with the second state context.

2. The method of claim 1, further comprising the steps of:
   reaching an end position in the second state context corresponding to a conclusion of processing associated with the second state context in the GPU;
   switching to the first state context for processing in the GPU such that the first state context is retrieved from memory and restored to the precise processing position corresponding to the receipt of the interrupt command or event; and
   processing a remainder portion of the first state context from the precise processing position to an end of the first state context.

3. The method of claim 2, further comprising the step of:
   inserting a restore command in a data structure executed by the GPU so as to cause the GPU to access a state context save buffer containing information associated with the first state context, wherein the GPU can restore execution of instructions associated with the first state context at a point corresponding to the receipt of the interrupt command.

4. The method of claim 1, further comprising the step of:
   processing the first state context prior to receipt of the interrupt command such that a data structure of the first state context includes a head and tail pointer and a place holder that contains a skip command prior to receipt of an interrupt command and may contain a restore command after receipt of the interrupt command.

5. The method of claim 1, further comprising the step of:
   forwarding state register data associated with the first state context from each of a plurality of processing units in the GPU to a processor in the GPU so that the state register data is stored in the memory for subsequent retrieval, wherein at least one of the plurality of processing units forwards state register data to another of the plurality of processing units that has a communication path with the processor.

6. The method of claim 1, wherein the interrupt command is received from a processor coupled to the GPU.

7. The method of claim 1, wherein the interrupt event is generated by a circuit of the GPU.

8. The method of claim 1, further comprising the steps of:
   establishing a first register containing an individual offset value for a number of processing blocks in a pipeline of the GPU, the individual offset value being a combination of an offset register content and a register ID; and
   establishing a second register containing data corresponding to a length of state data for a number of processing blocks in the pipeline and an upper limit of data for each processing block.

9. The method of claim 8, wherein the individual offset value is 128-bit aligned and the upper limit of data is an opcode double word for each processing block.

* * * * *